United States Patent
Wang

(10) Patent No.: US 12,464,222 B2
(45) Date of Patent: Nov. 4, 2025

(54) METHOD AND APPARATUS FOR DISPLAYING PREVIEW IMAGE, AND READABLE STORAGE MEDIUM

(71) Applicant: Honor Device Co., Ltd., Shenzhen (CN)

(72) Inventor: Jianxian Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/685,083

(22) PCT Filed: Aug. 31, 2022

(86) PCT No.: PCT/CN2022/116209
§ 371 (c)(1),
(2) Date: Feb. 20, 2024

(87) PCT Pub. No.: WO2023/124178
PCT Pub. Date: Jul. 6, 2023

(65) Prior Publication Data
US 2024/0357228 A1    Oct. 24, 2024

(30) Foreign Application Priority Data
Dec. 31, 2021   (CN) .......................... 202111683163.0

(51) Int. Cl.
*H04N 5/335*    (2011.01)
*G06F 1/16*    (2006.01)
(Continued)

(52) U.S. Cl.
CPC ......... *H04N 23/632* (2023.01); *G06F 1/1641* (2013.01); *G06F 3/1423* (2013.01); *H04N 23/53* (2023.01)

(58) Field of Classification Search
CPC .................................................... H04N 23/632
See application file for complete search history.

(56) References Cited

U.S. PATENT DOCUMENTS 11,347,370 B2 *   5/2022   Lee .................. G06Q 50/01
2008/0121711 A1 *  5/2008   Blumer .................... G06K 7/10
                                                                235/375
(Continued)

FOREIGN PATENT DOCUMENTS

CN    107770312 A    3/2018
CN    108234875 A    6/2018
(Continued)

*Primary Examiner* — Gary C Vieaux
(74) *Attorney, Agent, or Firm* — Slater Matsil, LLP

(57) ABSTRACT

A method and an apparatus for displaying a preview image, and a readable storage medium. The method includes: enabling a camera in response to detecting a camera enabling operation; displaying a first preview image on a first display, where the first preview image is generated based on a first framing content collected by the camera; lighting up a second display when a collaboration condition is triggered, where the collaboration condition is a condition of synchronously displaying the first preview image on the second display; copying the first framing content to obtain a second framing content; generating a second preview image based on the second framing content; and displaying the second preview image on the second display.

20 Claims, 20 Drawing Sheets

(51) Int. Cl.
*G06F 3/14* (2006.01)
*H04N 23/53* (2023.01)
*H04N 23/63* (2023.01)

(56) References Cited

U.S. PATENT DOCUMENTS

| | | | |
|---|---|---|---|
| 2008/0136940 A1* | 6/2008 | Srikanth | H04N 1/215 |
| | | | 386/E5.072 |
| 2013/0076591 A1 | 3/2013 | Sirpal et al. | |
| 2014/0101576 A1 | 4/2014 | Kwak et al. | |
| 2020/0012324 A1 | 1/2020 | Sung et al. | |
| 2020/0329178 A1 | 10/2020 | Moon et al. | |
| 2020/0389578 A1 | 12/2020 | Lee et al. | |
| 2021/0389873 A1 | 12/2021 | Chen et al. | |
| 2022/0321795 A1 | 10/2022 | Jiang et al. | |

FOREIGN PATENT DOCUMENTS

| | | | |
|---|---|---|---|
| CN | 108833769 A | 11/2018 | |
| CN | 111385456 A | 7/2020 | |
| CN | 110401766 B | 12/2021 | |
| CN | 114401340 A | 4/2022 | |
| KR | 20210102010 A | 8/2021 | |
| WO | 2020246727 A1 | 12/2020 | |

* cited by examiner

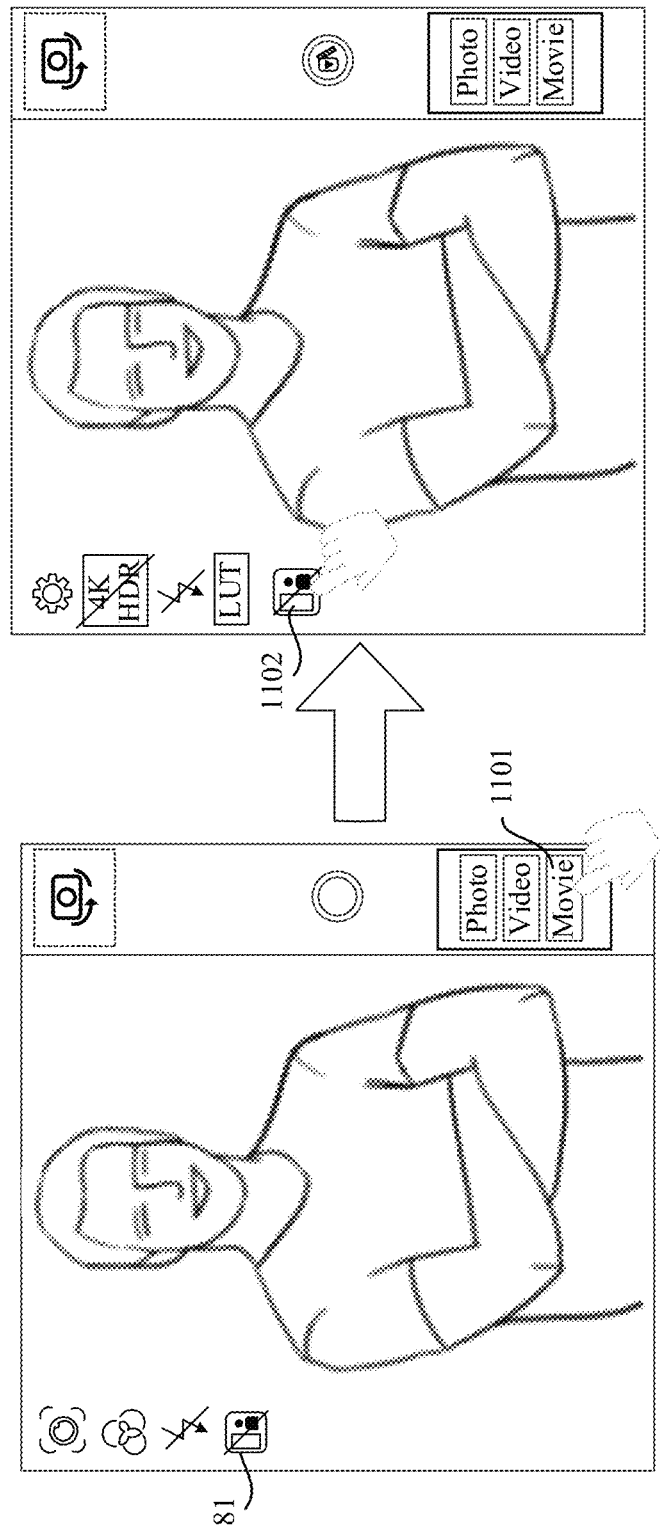

METHOD AND APPARATUS FOR DISPLAYING PREVIEW IMAGE, AND READABLE STORAGE MEDIUM

CROSS-REFERENCE TO RELATED APPLICATIONS

This application is a national stage of International Application No. PCT/CN2022/116209, filed on Aug. 31, 2022, which claims priority to Chinese Patent Application No. 202111683163.0, filed on Dec. 31, 2021. The disclosures of both of the aforementioned applications are hereby incorporated by reference in their entireties.

TECHNICAL FIELD

This application relates to the technical field of terminals, and in particular, to a method and an apparatus for displaying a preview image, and a readable storage medium.

BACKGROUND

Currently, an electronic device such as a mobile phone provides functions such as photographing and video recording. When a camera application is enabled, this type of electronic device displays a preview image, so that a photographing user can guide a photographed user to adjust a photographing posture of the photographed user based on the preview image before photographing.

With the rapid development of electronic devices, an electronic device having a foldable display has been widely promoted. During photographing by using the electronic device having a foldable display, the photographing user may unfold the foldable display. After the electronic device detects an operation performed by the photographing user of enabling the camera application, a preview image of the photographed user is usually displayed only on a display on a front side of the electronic device.

However, the manner for displaying the preview image in the above implementation is relatively monotonous.

SUMMARY

This application provides a method and an apparatus for displaying a preview image, and a readable storage medium, to resolve a problem of a relatively single manner for displaying the preview image in the related art. The technical solutions are as follows:

According to a first aspect, a method for displaying a preview image is provided, applicable to an electronic device having a foldable display, where the foldable display includes a first display and a second display, the first display is arranged on a front side of the electronic device, the second display is arranged on a back side of the electronic device, and the method includes:
  enabling a camera in response to detecting a camera enabling operation;
  displaying a first preview image on the first display, where the first preview image is generated based on a first framing content collected by the camera;
  lighting up the second display when a collaboration condition is triggered, where the collaboration condition is a condition of synchronously displaying the first preview image on the second display;
  copying the first framing content to obtain a second framing content;
  generating a second preview image based on the second framing content; and displaying the second preview image on the second display.

In an example of this application, the first display may be referred to as an inner display, and the second display may be referred to as an outer display.

In this way, the preview image is synchronously displayed on the first display and the second display of the electronic device, which adds a manner for displaying the preview image, so that a user located on a front side of the electronic device and a user located on the back side of the electronic device can simultaneously see the preview image, thereby improving photographing experience of the user.

In an example of this application, the electronic device includes an image display system. The lighting up the second display when a collaboration condition is triggered includes:
  creating a first function module through the image display system when the collaboration condition is triggered, where the first function module is configured to light up the second display; and
  lighting up the second display through the first function module.

In an example, the first function module is only configured to light up the second display. Therefore, through creating of the first function module to light up the second display, a lighting speed can be improved.

In an example of this application, the image display system includes a camera service module and a camera hardware management module. The copying the first framing content, to obtain a second framing content includes:
  copying the first framing content through the camera service module, to obtain the second framing content, where the first framing content is obtained from the camera by the camera hardware management module; and
  adding the second framing content to a first graphics buffer through the camera service module, where the first graphics buffer is created by the camera application in a case that it is determined that the collaboration condition is triggered, and the first graphics buffer is configured to store a framing content of a preview image to be displayed on the second display.

Through copy of the first framing content, the second framing content is obtained, and the second framing content is added to the first graphics buffer, so that the second preview image that is the same as the first preview image can be displayed on the second display based on the first graphics buffer, thereby implementing coordination display.

In an example of this application, before the adding the second framing content to a first graphics buffer through the camera service module, the method further includes: creating the first graphics buffer through the camera application when the collaboration condition is triggered; and transmitting first address information of the first graphics buffer to the camera service module through the camera application.

The adding the second framing content to a first graphics buffer through the camera service module includes:
  adding the second framing content to the first graphics buffer based on the first address information through the camera service module.

Through creating of the first graphics buffer, the second framing content displayed on the second display may be facilitated subsequent caching, thereby implementing the coordination display.

In an example of this application, the image display system further includes a graphics drawing module, and the generating a second preview image based on the second framing content includes:

instructing the graphics drawing module to read the second framing content through the camera application when it is determined through the camera application that the first graphics buffer includes the second framing content;

reading the second framing content from the first graphics buffer through the graphics drawing module; and generating the second preview image based on the second framing content through the graphics drawing module.

The displaying the second preview image on the second display includes:

displaying the second preview image on the second display through the graphics drawing module.

Through the graphics drawing module, the second framing content is read from the first graphics buffer, the second preview image is generated, and the second preview image is displayed on the second display, thereby implementing the coordination display.

In an example of this application, before the lighting up the second display when a collaboration condition is triggered, the method further includes:

displaying a collaboration switch on the first display through the camera application when the foldable display is in an unfolded state and a rear camera is currently enabled, where the collaboration switch is configured to control whether to enable a function of synchronously displaying the first preview image on the second display; and determining that the collaboration condition is triggered when it is detected through the camera application that the collaboration switch is enabled.

When the foldable display is in the unfolded state and the rear camera is enabled, it indicates that a user located on a back side of a mobile phone may need to see a preview image, for which the collaboration switch is displayed. When the collaboration switch is triggered and enabled, the user located on the back side of the mobile phone needs to see the preview image. Therefore, it is determined that the collaboration function needs to be enabled, so that the user can see the preview image from the second display.

In an example of this application, the unfolded state is that a folding angle of the foldable display is greater than a preset angle threshold and less than or equal to 180 degrees.

In an example of this application, the image display system further includes a display status monitoring module, and a manner for determining that the foldable display is in the unfolded state includes:

transmitting a registration request to the display status monitoring module through the camera application, where the registration request is used for requesting to monitor a state of the foldable display;

controlling the display status monitoring module to transmit first indication information to the camera application when it is monitored through the display status monitoring module that the foldable display is in the unfolded state, where the first indication information is used for indicating that the display is in the unfolded state; and determining that the foldable display is in the unfolded state based on the first indication information through the camera application.

In an example of this application, after the determining that the collaboration condition is triggered when it is detected through the camera application that the collaboration switch is enabled, the method further includes:

releasing the first graphics buffer through the camera application when it is detected through the camera application that the collaboration switch is disabled;

transmitting a collaboration termination message to the camera service module through the camera application, where the collaboration termination message is used for instructing to stop storing the second framing content in the first graphics buffer; and controlling the camera service module to stop storing the second framing content in the first graphics buffer after the collaboration termination message is received.

In this way, when the collaboration function is disabled, the first graphics buffer is released, which can save memory resources.

In an example of this application, the method further includes:

controlling the first function module to turn off the second display through the image display system when it is detected through the camera application that the collaboration switch is disabled.

In this way, when the collaboration function is disabled, the second display is disabled, which can save hardware resources.

According to a second aspect, an apparatus for displaying a preview image is provided, configured in an electronic device having a foldable display, where the foldable display includes a first display and a second display, the first display is arranged on a front side of the electronic device, and the second display is arranged on a back side of the electronic device.

A structure of the apparatus for displaying a preview image includes a processor and a memory. The memory is configured to store a program supporting the apparatus for displaying a preview image to perform the method according to any implementation of the first aspect, and store data for implementing the method according to any implementation of the first aspect. A communication bus is configured to establish a connection between the processor and the memory. The processor is configured to:

enable a camera in response to detecting a camera enabling operation;

display a first preview image on the first display, where the first preview image is generated based on a first framing content collected by the camera;

light up the second display when a collaboration condition is triggered, where the collaboration condition is a condition of synchronously displaying the first preview image on the second display;

copy the first framing content to obtain a second framing content;

generate a second preview image based on the second framing content; and display the second preview image on the second display.

In an example of this application, the electronic device includes an image display system. The processor is configured to:

create a first function module through the image display system when the collaboration condition is triggered, where the first function module is configured to light up the second display; and light up the second display through the first function module.

In an example of this application, the image display system includes a camera service module and a camera hardware management module. The processor is configured to:
  copy the first framing content through the camera service module, to obtain the second framing content, where the first framing content is obtained from the camera by the camera hardware management module; and
  add the second framing content to a first graphics buffer through the camera service module, where the first graphics buffer is created by the camera application in a case that it is determined that the collaboration condition is triggered, and the first graphics buffer is configured to store a framing content of a preview image to be displayed on the second display.

In an example of this application, the processor is further configured to:
  create the first graphics buffer through the camera application when the collaboration condition is triggered; and
  transmit first address information of the first graphics buffer to the camera service module through the camera application.

The adding the second framing content to a first graphics buffer through the camera service module includes:
  adding the second framing content to the first graphics buffer based on the first address information through the camera service module.

In an example of this application, the image display system further includes a graphics drawing module. The processor is configured to:
  instruct the graphics drawing module to read the second framing content through the camera application when it is determined through the camera application that the first graphics buffer includes the second framing content;
  read the second framing content from the first graphics buffer through the graphics drawing module; and
  generate the second preview image based on the second framing content through the graphics drawing module.

The displaying the second preview image on the second display includes:
  displaying the second preview image on the second display through the graphics drawing module.

In an example of this application, the processor is further configured to:
  display a collaboration switch on the first display through the camera application when the foldable display is in an unfolded state and a rear camera is currently enabled, where the collaboration switch is configured to control whether to enable a function of synchronously displaying the first preview image on the second display; and
  determine that the collaboration condition is triggered when it is detected through the camera application that the collaboration switch is enabled.

In an example of this application, the unfolded state is that a folding angle of the foldable display is greater than a preset angle threshold and less than or equal to 180 degrees.

In an example of this application, the image display system further includes a display status monitoring module, the processor is further configured to:
  transmit a registration request to the display status monitoring module through the camera application, where the registration request is used for requesting to monitor a state of the foldable display;
  control the display status monitoring module to transmit first indication information to the camera application when it is monitored through the display status monitoring module that the foldable display is in the unfolded state, where the first indication information is used for indicating that the display is in the unfolded state; and
  determine that the foldable display is in the unfolded state based on the first indication information through the camera application.

In an example of this application, the processor is further configured to:
  release the first graphics buffer through the camera application when it is detected through the camera application that the collaboration switch is disabled;
  transmit a collaboration termination message to the camera service module through the camera application, where the collaboration termination message is used for instructing to stop storing the second framing content in the first graphics buffer; and
  control the camera service module to stop storing the second framing content in the first graphics buffer after the collaboration termination message is received.

In an example of this application, the processor is further configured to:
  control the first function module to turn off the second display through the image display system when it is detected through the camera application that the collaboration switch is disabled.

According to a third aspect, a computer-readable storage medium is provided. The computer-readable storage medium stores instructions, and the instructions, when run on a computer, cause the computer to perform the method in the first aspect.

According to a fourth aspect, a computer program product including instructions is provided. The instructions, when run on a computer, cause the computer to perform the method in the first aspect.

Technical effects obtained in the second aspect, the third aspect, the fourth aspect, and the fifth aspect are similar to technical effects obtained by the corresponding technical means in the first aspect. Details are not described herein again.

BRIEF DESCRIPTION OF THE DRAWINGS

FIG. 11A, FIG. 11B, FIG. 11C, and FIG. 11D are schematic diagrams of an interface in a movie mode according to an example embodiment;

DETAILED DESCRIPTION OF ILLUSTRATIVE EMBODIMENTS

To make objectives, technical solutions, and advantages of this application clearer, implementations of this application are further described in detail below with reference to the drawings.

It should be understood that "a plurality of" mentioned in this application means two or more. In the descriptions of this application, unless otherwise specified, "/" means "or". For example, A/B may mean A or B. In this specification, "and/or" is merely an association relationship for describing associated objects, and indicates that three relationships may exist. For example, A and/or B may represent only A exists, both A and B exist, and only B exists. Moreover, for ease of describing the technical solutions of this application clearly, terms such as "first" and "second" are used to distinguish between same or similar items with substantially same functions and roles. A person skilled in the art may understand that the terms "first", "second", and the like does not limit a quantity and an execution order, and the terms "first", "second", and the like are not limited to be necessarily different.

Reference to "one embodiment" or "some embodiments" described in this specification of this application means that a specific characteristic, structure, or feature described in combination with the embodiment is included in one or more embodiments of this application. Therefore, statements such as "in an embodiment", "in some embodiments", "in some other embodiments", and "in some additional embodiments" in different parts of this specification do not necessarily mean referring to a same embodiment. Instead, the statements mean "one or more but not all of embodiments", unless otherwise specifically emphasized in another manner. The terms "comprise", "include", "have", and variations thereof all mean "including but not limited to", unless otherwise specifically emphasized in another manner.

In a possible application scenario, when a user A uses a rear camera of a mobile phone to take a picture of a user B, the user B also wants to see his/her status in a preview image of the mobile phone, so as to adjust his/her photographing posture, arrange his/her hairstyle, or adjust his/her position to blend in with a scenery behind himself/herself.

In another possible application scenario, the user B has relatively professional techniques for photography. When the user A uses the rear camera of the mobile phone to take a picture of the user B, the user B also wants to see the preview image in the mobile phone, so as to tell the user A how to adjust image quality of the preview image from a professional perspective, for example, tell the user A how to adjust parameters such as brightness, white balance, and field of view based on the preview image.

Figure 1:
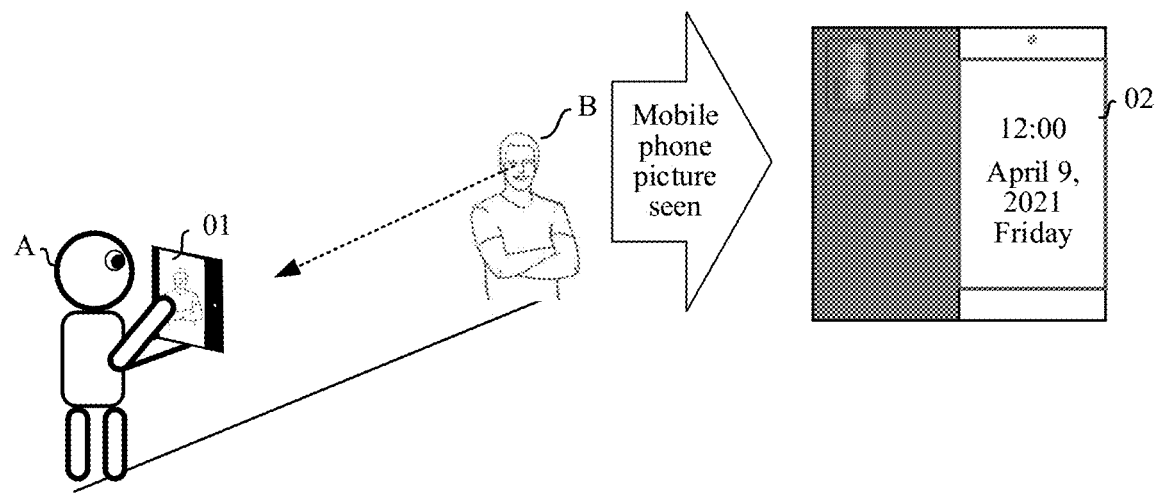
FIG. 1 is a schematic diagram of an application scenario according to an example embodiment.

In some scenarios, a mobile phone having a foldable display may be used to take a picture. A preview image may be displayed on a display on a front side (referred to as an inner display below) of the mobile phone, but a standby picture is displayed on a display on a back side (referred to as an outer display below) of the mobile phone. For example, referring to FIG. 1, the user A takes a picture of the user B. The user A may see the preview image of the user B from an inner display 01 of the mobile phone, while the user B may see a standby picture with a date and time displayed from an outer display 02 of the mobile phone. In this way, the user B is unable to view his/her preview image, resulting in poor photographing experience of the user.

Figure 2:
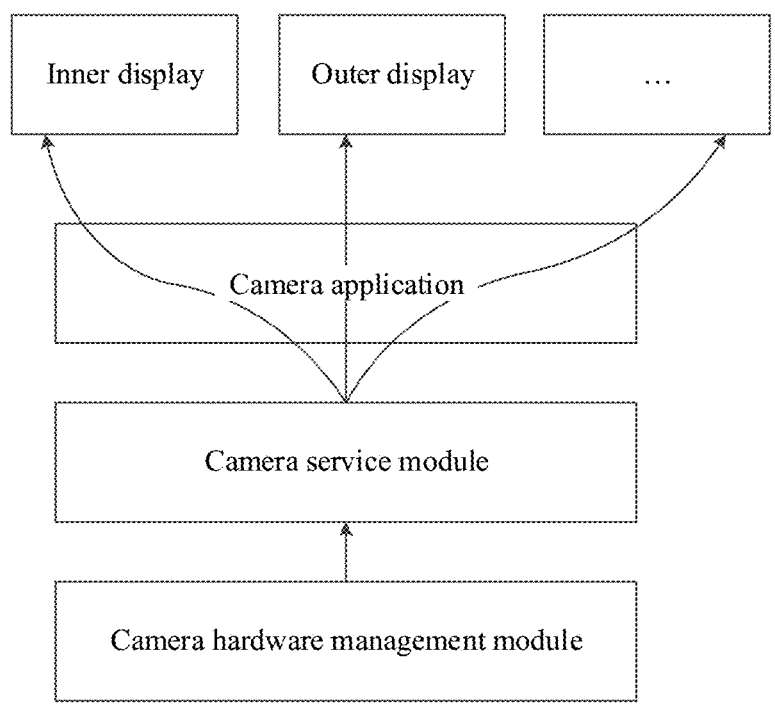
FIG. 2 is a schematic diagram of a framework for displaying a video frame according to an example embodiment.
Figure 3:
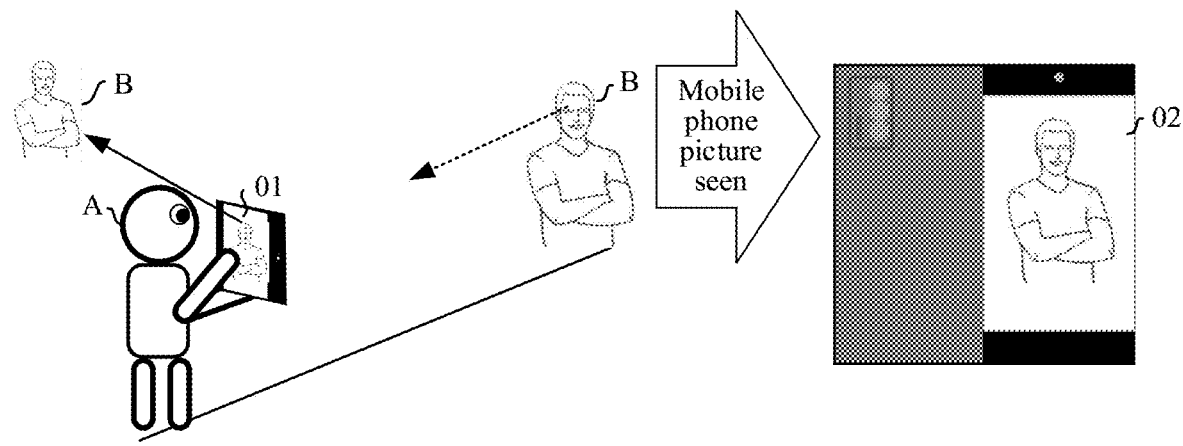
FIG. 3 is a schematic diagram of an application scenario according to another example embodiment.

To enable the user B to see his/her preview image as well, embodiments of this application provide a method for displaying a preview image. The method may be applicable to a mobile phone having a foldable display. The foldable display includes at least an inner display and an outer display. Referring to FIG. 2, according to the method, a framing content is obtained from a camera through a camera hardware management module, and then the framing content is copied through a camera service module to obtain two framing contents. Each of the two framing contents is used for generating a first preview image and a second preview image. The mobile phone may display the first preview image and the second preview image respectively on the inner display and the outer display through a camera application. It is not difficult to understand that the first preview image and the second preview image are the same. Therefore, as shown in FIG. 3, the method not only may enable a photographing user to see the preview image of the user B from the inner display 01 of the mobile phone, but also may enable a photographed user to see his/her preview image from the outer display 02.

Figure 4:
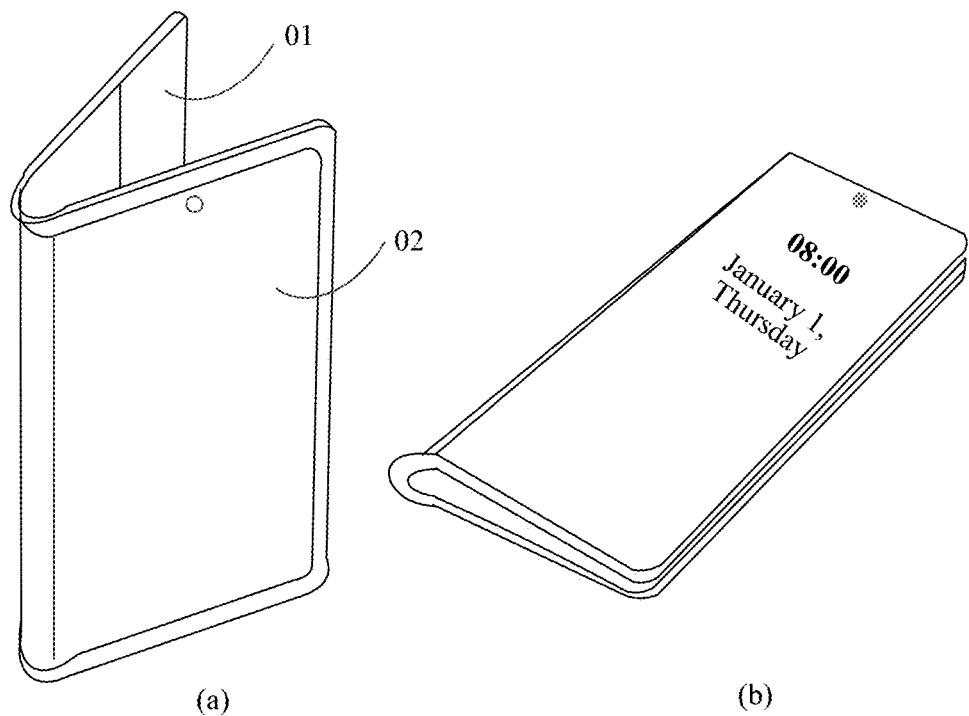
FIG. 4 is a schematic diagram of an electronic device having a foldable display according to an example embodiment.
Figure 5:
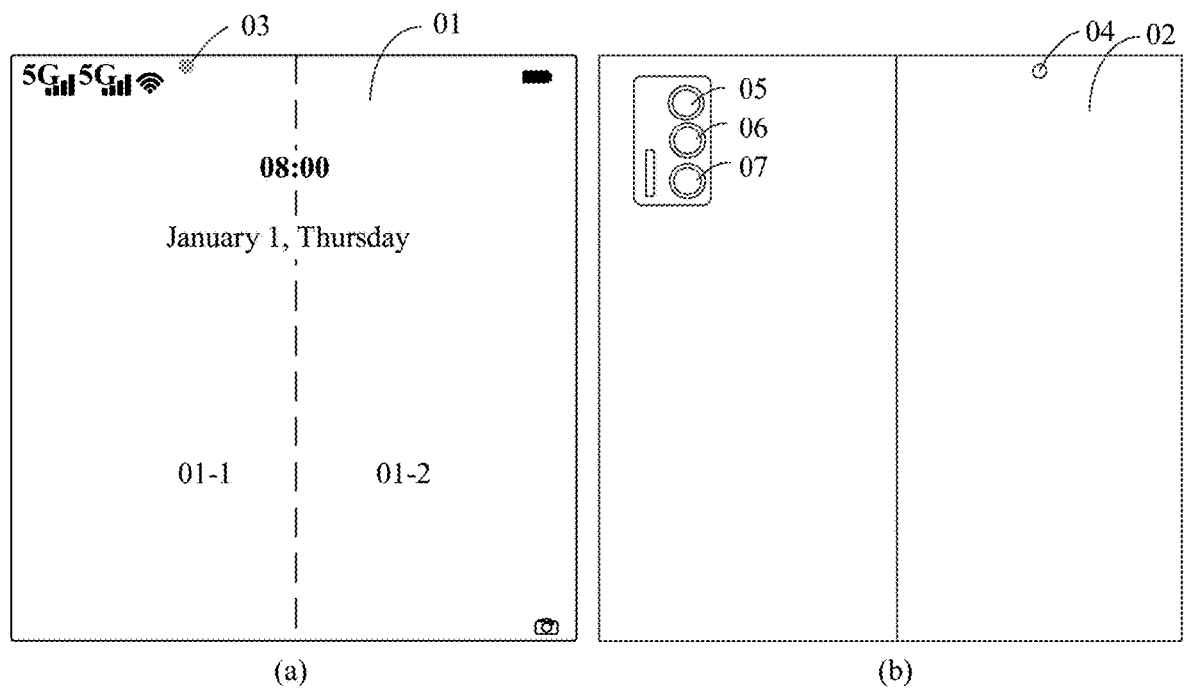
FIG. 5 is a schematic diagram of an inner display and an outer display of an electronic device according to an example embodiment.

Before the method provided in embodiments of this application is described in detail, an execution subject involved in embodiments of this application is first described. The method may be applicable to an electronic device having a foldable display. FIG. 4 shows an electronic device having a foldable display according to an example embodiment. (a) in FIG. 4 is a schematic diagram of an electronic device in an unfolded state. (b) in FIG. 4 is a schematic diagram of an electronic device in a folded state. As shown in (a) in FIG. 4, the electronic device includes at least a first display 01 and a second display 02. The first display 01 is arranged on a front side of the electronic device and may be referred to as an inner display of the electronic device. The second display 02 is arranged on a back side of the electronic device and may be referred to as an outer display of the electronic device. For example, FIG. 5 is a schematic diagram of an unfolded state of a foldable display according to an example embodiment. (a) in FIG. 5 is a schematic diagram of the inner display. It can be seen that the inner display may be divided into an inner display area 01-1 and an inner display area 01-2 when the mobile phone is in an unfolded state. (b) in FIG. 5 is a schematic diagram of the back side of the mobile phone. An area 02 is the outer display of the mobile phone.

In an embodiment, the inner display 01 and the outer display 02 are both liquid crystal displays (Liquid Crystal Displays, LCDs). For example, the inner display 01 is LCD 0, and the outer display 02 is LCD 1.

It should be noted that embodiments of this application are only described by using an example in which the electronic device includes two displays. In another embodiment, the electronic device may further include three or more displays. Certainly, at least one outer display is included. In other words, at least one display is arranged on the back side of the electronic device. In this case, referring to FIG. 2, the camera service module copies one framing content into a plurality of framing contents (for example, three framing contents are copied) to implement collaborative display of the three or more displays.

In an example of this application, the electronic device is configured with a front camera and/or a rear camera. For example, referring to (a) in FIG. 5, the front camera includes a camera 03. The camera 03 may be arranged in the inner display area 01-1 or the inner display area 01-2 of the mobile phone. In other words, when the mobile phone is in the unfolded state, the camera 03 is used as the front camera. Referring to (b) in FIG. 5, a front camera 04 is arranged on the outer display of the electronic device. In other words, when the mobile phone is in the folded state, the camera 04 is used as the front camera. The rear camera may include a camera 05, a camera 06, and a camera 07. In addition, the electronic device includes a camera application. The camera application may use the front camera or the rear camera for photographing, recording, and the like. In an embodiment, the electronic device may include but is not limited to a mobile phone, a tablet computer, a portable computer, a notebook computer, and a smart wearable device. This is not limited in embodiments of this application.

Figure 6:
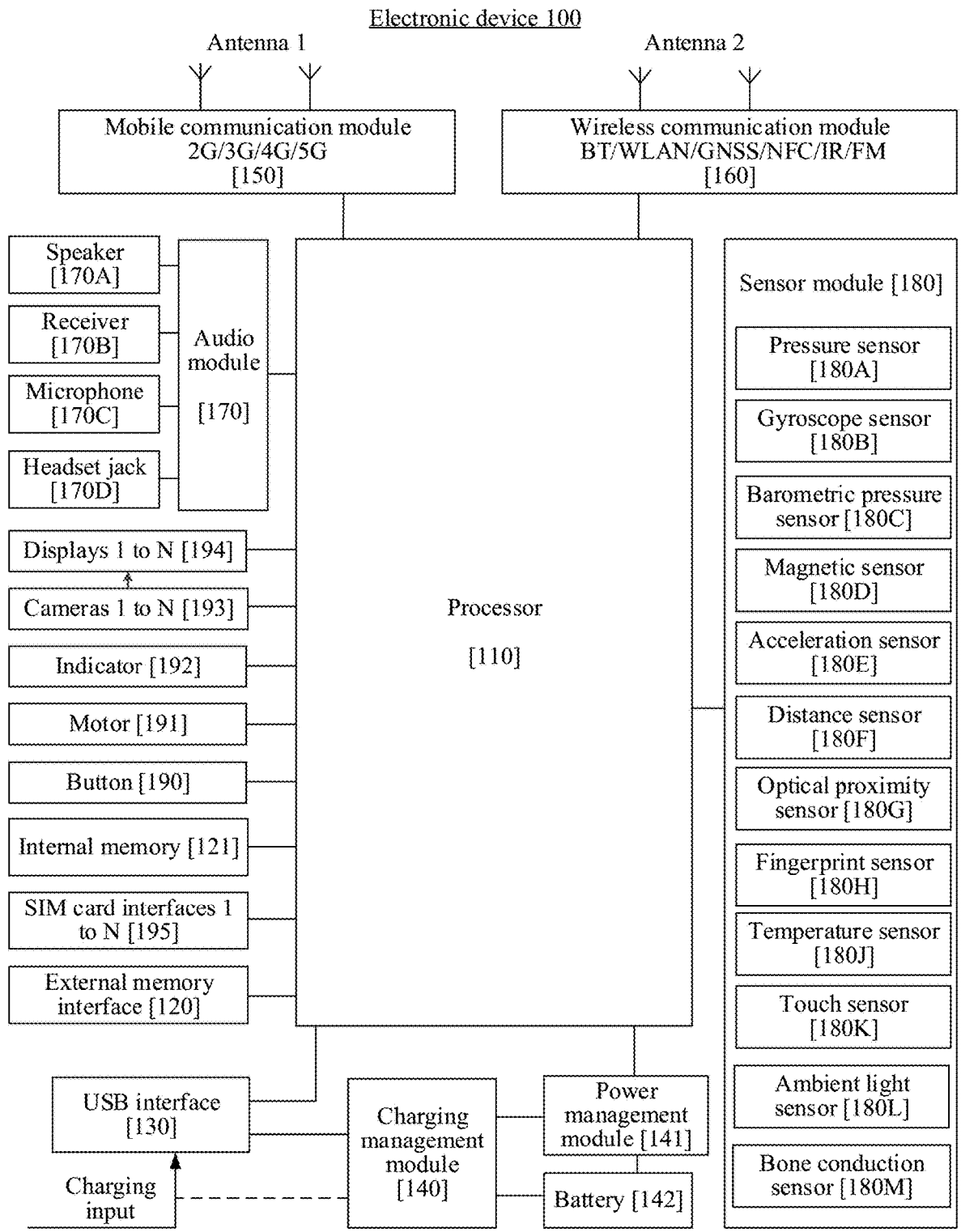
FIG. 6 is a schematic diagram of a structure of an electronic device according to an example embodiment.

FIG. 6 is a schematic diagram of a structure of an electronic device according to an embodiment of this application. Referring to FIG. 6, an electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component deployment may be used. The components shown in the figure may be implemented through hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further arranged in the processor 110, and is configured to store instructions and data. In some embodiments, the memory in the processor 110 is a cache memory. The memory may store instructions or data that has just been used or cyclically used by the processor 110. If the processor 110 needs to use the instructions or data again, the instructions or data may be directly invoked from the memory. This avoids repeated access, and reduces a waiting time of the processor 110, thereby improving system efficiency.

In some embodiments, the processor 110 may include one or more interfaces, for example, may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a bidirectional synchronous serial bus, and includes a serial data line (serial data line, SDA) and a serial clock line (serial clock line, SCL). In some embodiments, the processor 110 may include a plurality of sets of I2C interfaces. The processor 110 may be respectively coupled to the touch sensor 180K, a charger, a flash, the camera 193, and the like through different I2C interfaces. For example, the processor no may be coupled to the touch sensor 180K through the I2C interface, so that the processor no communicates with the touch sensor 180K through the I2C interface, to implement a touch function of the electronic device 100.

The I2S interface may be configured to perform audio communication. In some embodiments, the processor 110 may include a plurality of sets of I2S interfaces. The processor 110 may be coupled to the audio module 170 through the I2S interface, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may alternatively be configured to perform audio communication, and sample, quantize, and encode an analog signal. In some embodiments, the audio module 170 may be coupled to the wireless communication module 160 through a PCM interface. In some embodiments, the audio module 170 may alternatively transmit an audio signal to the wireless communication module 160 through the PCM interface, to implement the function of answering a call through the Bluetooth headset.

The UART interface is a universal serial data bus, and is configured to perform asynchronous communication. The UART interface may be a bidirectional communication bus. The UART interface may convert to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through a UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured through software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a Mini USB interface, a Micro USB interface, a USB Type-C interface, or the like. The USB interface 130 may be configured to be connected to the charger to charge the electronic device 100, or may be configured to transmit data between the electronic device 100 and the peripheral device, or may be configured to be connected to a headset to play audio through the headset. The USB interface 130 may be further configured to be connected to another electronic device such as an AR device.

It may be understood that a schematic interface connection relationship between the modules in embodiments of this application is merely an example for description, and constitutes no limitation on the structure of the electronic device 100. In some other embodiments of this application, the electronic device 100 may alternatively use an interface connection manner different from that in the above embodiment, or use a combination of a plurality of interface connection manners.

The charging management module 140 is configured to receive a charging input from the charger. The charger may be a wireless charger, or may be a wired charger. In some embodiments of wired charging, the charging management module 140 may receive a charging input of the wired charger through the USB interface 130. In some embodiments of wireless charging, the charging management module 140 may receive a wireless charging input through a wireless charging coil of the electronic device 100. The charging management module 140 may supply power to the electronic device 100 through the power management unit 141 while charging the battery 142.

The power management module 141 is configured to be connected to the battery 142, the charging management module 140, and the processor 110. The power management module 141 receives an input of the battery 142 and/or the charging management module 140, to supply power to the processor 110, the internal memory 121, an external memory, a display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be arranged in the processor 110. In some other embodiments, the power management module 141 and the charging management module 140 may alternatively be arranged in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may further be multiplexed to improve antenna utilization. For example, the antenna 1 may be multiplexed as a diversity antenna of a wireless local area network. In some other embodiments, the antennas may be used in combination with a tuning switch.

The mobile communication module 150 may provide a wireless communication solution including 2G/3G/4G/5G applicable to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit the processed electromagnetic wave to the modem processor for demodulation. The mobile communication module 150 may further amplify a signal modulated by the modem processor, and convert the amplified signal into an electromagnetic wave through the antenna 1 for radiation. In some embodiments, at least some function modules of the mobile communication module 150 may be arranged in the processor 110. In some embodiments, at least some function modules of the mobile communication module 150 may be arranged in a same device as at least some modules of the processor 110.

The modem processor may include a modulator and a demodulator. The modulator is configured to modulate a to-be-transmitted low-frequency baseband signal into a medium-high frequency signal. The demodulator is configured to demodulate a received electromagnetic wave signal into a low-frequency baseband signal. Then the demodulator transmits the demodulated low-frequency baseband signal to the baseband processor for processing. The low-frequency baseband signal is processed by the baseband processor and then transmitted to the application processor. The application processor outputs a sound signal through an audio device (which is not limited to the speaker 170A, the receiver 170B, and the like), or displays an image or a video through the display 194. In some embodiments, the modem processor may be an independent device. In some other embodiments, the modem processor may be independent of the processor 110, and is arranged in a same device as the mobile communication module 150 or another function module.

The wireless communication module 160 may provide solutions including wireless communication such as a wireless local area network (wireless local area networks, WLAN) (for example, a wireless fidelity (wireless fidelity, Wi-Fi) network), bluetooth (bluetooth, BT), a global navigation satellite system (global navigation satellite system, GNSS), frequency modulation (frequency modulation, FM), the near field communication (near field communication, NFC) technology, and the infrared (infrared, IR) technology that are applicable to the electronic device 100. The wireless communication module 160 may be one or more component integrating at least one communication processing module. The wireless communication module 160 receives an electromagnetic wave through the antenna 2, performs frequency modulation and filtering processing on the electromagnetic wave signal, and transmits a processed signal to the processor 110. The wireless communication module 160 may further receive a to-be-transmitted signal from the processor 110, perform frequency modulation and amplification on the signal, and convert the to-be-transmitted signal into an electromagnetic wave through the antenna 2 for radiation.

In some embodiments, the antenna 1 of the electronic device 100 is coupled to the mobile communication module 150, and the antenna 2 is coupled to the wireless communication module 160, so that the electronic device 100 can communicate with a network and another device through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculation, and is configured to perform graphics rendering. The processor 110 may include one or more GPUs and is configured to execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLED, a Micro-OLED, quantum dot light emitting diodes (quantum dot light emitting diodes, QLED), and the like. In some embodiments, the electronic device 100 may include 1 or N displays 194, where N is an integer greater than 1.

The electronic device 100 may implement the photographing function through the ISP, the camera 193, the video codec, the GPU, the display 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transmits the electrical signal to the ISP for processing, and the processed electrical signal is converted into an image visible to a naked eye. The ISP may further perform algorithm optimization on noise, brightness, and a skin color of the image. The ISP may further optimize parameters such as exposure and color temperature of a to-be-photographed scenario. In some embodiments, the ISP may be arranged in the camera 193.

The camera 193 is configured to capture a static image or a video. An optical image is generated from an object through the lens and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include 1 or N cameras 193, where N is an integer greater than 1.

The digital signal processor is configured to process a digital signal, and in addition to a digital image signal, the digital signal processor may further process another digital signal. For example, when the electronic device 100 performs frequency selection, the digital signal processor is configured to perform Fourier transform on frequency energy, and the like.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, may quickly process input information by learning from a structure of a biological neural network, for example, by learning from a transmission mode between neurons in a human brain, and may further continuously perform self-learning. An application such as intelligent cognition of the electronic device 100 may be implemented through the NPU, for example, image recognition, face recognition, voice recognition, and text understanding.

The external memory interface 120 may be configured to connect an external storage card such as a Micro SD card, to expand a storage capacity of the electronic device 100. The external storage card communicates with the processor 110 through the external memory interface 120, to implement a data storage function. For example, files such as music and a video are stored in the external storage card.

The internal memory 121 may be configured to store computer executable program code. The computer executable program code includes an instruction. The processor 110 runs the instruction stored in the internal memory 121, to perform various function applications and data processing of the electronic device 100. The internal memory 121 may include a program storage area and a data storage area. The program storage area may store an operating system, an application program required by at least one function (for example, a sound playback function and an image playback function), and the like. The data storage area may store data (for example, audio data and a phonebook) created by the electronic device 100 during use. In addition, the internal memory 121 may include a high-speed random access memory, and may further include a non-volatile memory, for example, at least one disk storage device, a flash memory device, or a universal flash storage (universal flash storage, UFS).

The electronic device 100 may implement an audio function, such as music playback or recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be arranged in the processor 110, or some function modules in the audio module 170 are arranged in the processor 110.

The speaker 170A, also referred to as a "horn", is configured to convert an electrical audio signal into a sound signal. The electronic device 100 may listen to music or answer a hands-free call through the speaker 170A.

The receiver 170B, also referred to as an "earpiece", is configured to convert an electrical audio signal into a sound signal. When the electronic device 100 is configured to answer a call or receive voice information, the receiver 170B may be put close to a human ear to hear voice.

The microphone 170C, also referred to as a "voice tube" or "mike", is configured to convert a sound signal into an electrical signal. When making a call or sending voice information, a user may make a sound through a mouth approaching the microphone 170C, to input a sound signal into the microphone 170C. At least one microphone 170C may be arranged in the electronic device 100. In some other embodiments, two microphones 170C may be arranged in the electronic device 100, so as to collect sound signals and implement the function of noise reduction. In some other embodiments, three, four, or more microphones 170C may further be arranged in the electronic device 100, to collect a sound signal, implement noise reduction, recognize a sound source, implement a directional recording function, and the like.

The headset jack 170D is configured to be connected to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be arranged in the display 194. There are many types of pressure sensors 180A, such as a resistive pressure sensor, an inductive pressure sensor, and a capacitive pressure sensor. The capacitive pressure sensor may be a parallel plate including at least two conductive materials. When a force is applied to the pressure sensor 180A, a capacitance between electrodes changes. The electronic device 100 determines intensity of the pressure based on the change in the capacitance. When a touch operation is performed on the display 194, the electronic device 100 detects a touch operation strength based on the pressure sensor 180A. The electronic device 100 may alternatively calculate a touch position based on a detection signal of the pressure sensor 180A. In some embodiments, touch operations performed on a same touch position but having different touch operation strengths may correspond to different operation instructions. For example, when a touch operation having a touch operation strength less than a pressure threshold is performed on a short message application icon, an instruction of viewing a short message is executed. When a touch operation having a touch operation strength greater than or equal to the pressure threshold is performed on the short message application icon, an instruction of creating a new short message is executed.

The gyroscope sensor 180B may be configured to determine a movement posture of the electronic device 100. In some embodiments, an angular velocity of the electronic device 100 around three axes (that is, x, y, and z axes) may be determined through the gyroscope sensor 180B. The gyroscope sensor 180B may be configured to perform image stabilization during photographing. For example, when the shutter is pressed, the gyroscope sensor 180B detects an angle at which the electronic device 100 jitters, calculates, based on the angle, a distance for which a lens module needs to compensate, and causes the lens to offset the jittering of the electronic device 100 through reverse movement, thereby implementing image stabilization. The gyroscope sensor 180B may be further applied to navigation and a motion sensing game scenario.

The barometric pressure sensor 180C is configured to measure an air pressure. In some embodiments, the electronic device 100 calculates an altitude through an air pressure value measured by the barometric pressure sensor 180C, and assists positioning and navigation.

The magnetic sensor 180D includes a Hall sensor. The electronic device 100 may detect opening and closing of a flip leather cover by using the magnetic sensor 180D. In some embodiments, when the electronic device 100 is a clamshell phone, the electronic device 100 may detect opening and closing of a flip based on the magnetic sensor 180D. The electronic device 100 sets, based on the detected opening or closing status of the leather cover or the flip, a feature such as automatic unlocking of the flip.

The acceleration sensor 180E may detect magnitudes of acceleration of the electronic device 100 in all directions (generally in three axes). When the electronic device 100 is stationary, a magnitude and a direction of gravity may be detected. The acceleration sensor 180E may be further configured to identify a posture of the electronic device 100, and is applied to applications such as landscape and portrait orientation switching and a pedometer.

The distance sensor 180F is configured to measure a distance. The electronic device 100 may measure a distance through infrared light or laser. In some embodiments, in a to-be-photographed scenario, the electronic device 100 may measure a distance by using the distance sensor 180F, to implement quick focusing.

The optical proximity sensor 180G may include a light emitting diode (LED) and an optical detector, such as a photodiode. The light-emitting diode may be an infrared light-emitting diode. The electronic device 100 emits infrared light through the light emitting diode. The electronic device 100 detects infrared reflected light from a nearby object by using the photodiode. When sufficient reflected light is detected, the electronic device 100 may determine that an object exists near the electronic device 100. When insufficient reflected light is detected, it may be determined that there is no object near the electronic device 100. The electronic device 100 may detect, by using the optical proximity sensor 180G, that a user holds the electronic device 100 close to an ear for a call, so as to implement automatic screen-off to save power. The optical proximity sensor 180G may be further configured to automatically unlock and lock the screen in a leather cover mode and a pocket mode.

The ambient light sensor 180L is configured to sense brightness of ambient light. The electronic device 100 may adaptively adjust brightness of the display 194 based on the sensed brightness of the ambient light. The ambient light sensor 180L may be further configured to automatically adjust white balance during photographing. The ambient light sensor 180L may further cooperate with the optical proximity sensor 180G to detect whether the electronic device 100 is in a pocket to prevent an accidental touch.

The fingerprint sensor 180H is configured to collect a fingerprint. The electronic device 100 may implement fingerprint unlocking, application lock accessing, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 18J. For example, when the temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid abnormal shutdown of the electronic device 100 caused by a low temperature. In some other embodiments, when the temperature is lower than still another threshold, the electronic device 100 boosts an output voltage of the battery 142 to prevent abnormal shutdown caused by the low temperature.

The touch sensor 180K is also referred to as a "touch panel". The touch sensor 180K may be arranged on the display 194. The touch sensor 180K and the display 194 form a touchscreen, which is also referred to as a "touch screen". The touch sensor 180K is configured to detect a touch operation performed on or near the touch sensor. The touch sensor 180K may transmit the detected touch operation to the application processor, to determine a type of a touch event. A visual output related to the touch operation may be provided through the display 194. In some other embodiments, the touch sensor 180K may alternatively be arranged on a surface of the electronic device 100 at a position different from that of the display 194.

The bone conduction sensor 180M may obtain a vibration signal. In some embodiments, the bone conduction sensor 180M may obtain a vibration signal of an acoustic portion vibrating bone of a human body. The bone conduction sensor 180M may alternatively contact a human pulse to receive a blood pressure beating signal. In some embodiments, the bone conduction sensor 180M may alternatively be arranged in the headset, and combined into a bone conduction headset. The audio module 170 may parse out a voice signal based on the vibration signal of the acoustic portion vibrating bone that is obtained by the bone conduction sensor 180M, to implement a voice function. The application processor may parse heart rate information based on the blood pressure beating signal obtained by the bone conduction sensor 180M, to implement a function of heart rate detection.

The button 190 includes a power button, a volume button, and the like. The button 190 may be a mechanical button or a touch button. The electronic device 100 may receive a button input, and generate a button signal input related to user setting and function control of the electronic device 100.

The motor 191 may generate a vibration prompt. The motor 191 may be configured to provide an incoming call vibration prompt and touch vibration feedback. For example, touch operations performed on different applications (for example, photo taking and audio playing) may correspond to different vibration feedback effects. Touch operations performed on different areas of the display 194 may alternatively correspond to different vibration feedback effects. Different application scenarios (for example, a time reminder, information receiving, an alarm clock, and a game) may alternatively correspond to different vibration feedback effects. A touch vibration feedback effect may further be user-defined.

The indicator 192 may be an indicator light, and may be configured to indicate a charging state or a battery change, or may be configured to indicate a message, a missed call, a notification, and the like.

The SIM card interface 195 is configured to connect a SIM card. The SIM card may be inserted into the SIM card interface 195 or pulled out from the SIM card interface 195, to contact or be separated from the electronic device 100. The electronic device 100 may support one or N SIM card interfaces, where N is an integer greater than 1. The SIM card interface 195 may support a Nano SIM card, a Micro SIM card, a SIM card, and the like. A plurality of cards may be inserted into a same SIM card interface 195 simultaneously. The plurality of cards may be of a same type or different types. The SIM card interface 195 may be further compatible with different types of SIM cards. The SIM card interface 195 may be further compatible with an external memory card. The electronic device 100 interacts with a network through a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

Next, a software system of the electronic device 100 is described.

The software system of the electronic device 100 may use a layered architecture, an event-driven architecture, a micro-core architecture, a microservice architecture, or a cloud architecture. In this embodiment of this application, an Android (Android) system with a layered architecture is used as an example to describe the software system of the electronic device 100.

Figure 7:
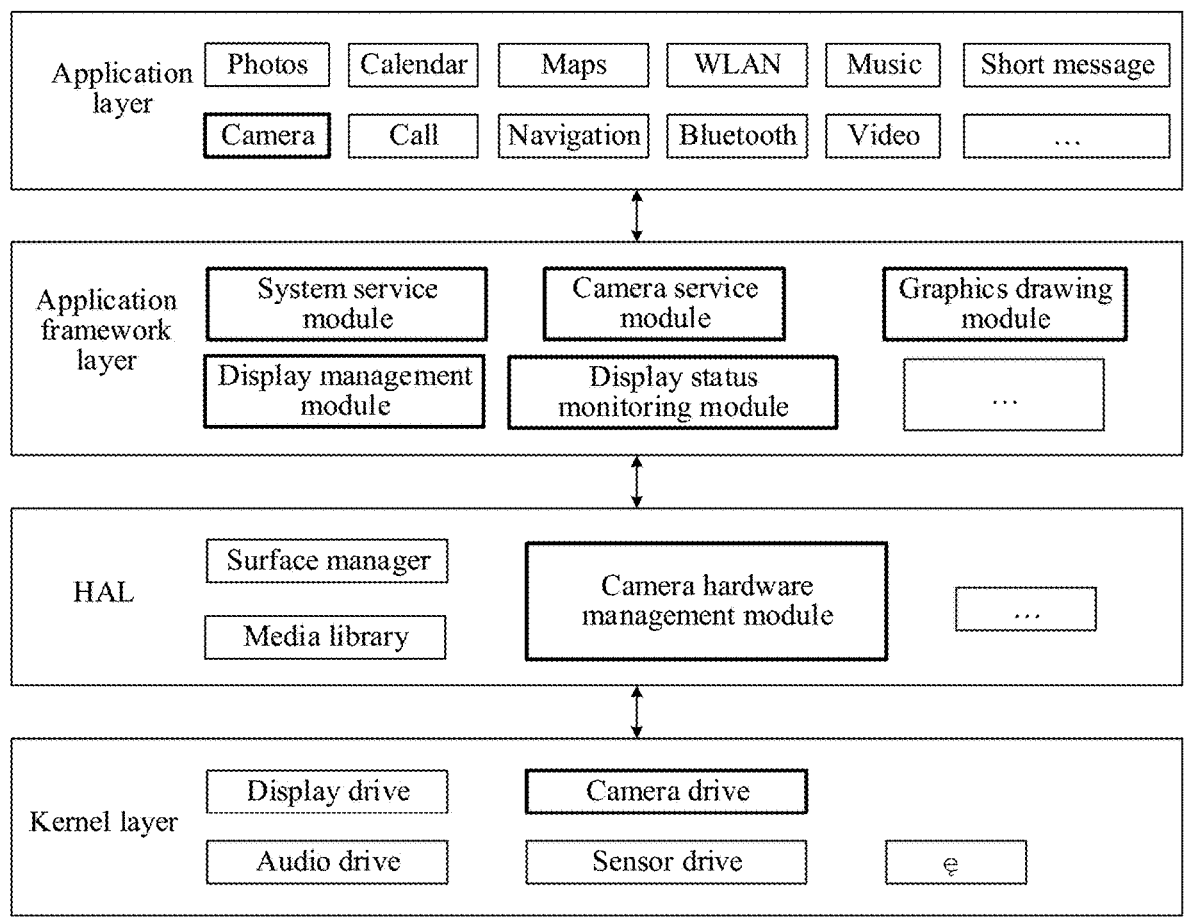
FIG. 7 is a schematic diagram of a software framework of an electronic device according to an example embodiment.

FIG. 7 is a block diagram of a software system of the electronic device 100 according to an embodiment of this application. Referring to FIG. 7, the layered architecture divides software into several layers. Each layer has a clear role and responsibility. The layers communicate with each other through a software interface. In some embodiments, the Android system is divided into four layers: an application layer, an application framework layer, a hardware abstraction layer (hardware abstraction layer, HAL), and a kernel layer from top to bottom.

The application layer may include a series of application packages. As shown in FIG. 7, the application packages may include applications such as camera, gallery, and the like. The camera application (referred to as a camera app for short) is configured for photographing, recording, and the like. The gallery is configured to store an image captured or a video recorded by the camera application. In an example, the camera application provides but is not limited to a camera mode such as a photographing mode, a recording mode, a movie mode, a portrait mode, and the like. A collaboration function can be supported in any of the camera modes. The collaboration function is that the first preview image displayed on the inner display is synchronously displayed on the outer display when the camera application is enabled and the foldable display is in an unfolded state. In an example, after the camera application is enabled, if it is determined that the foldable display is in the unfolded state and the rear camera is currently used, the camera application displays a collaboration switch. The collaboration switch is configured to control whether to enable the collaboration function. In other words, through displaying of the collaboration switch, the user can control whether a function that the first preview image is synchronously displayed on the outer display is enabled. For example, if the user enables the collaboration switch, the collaboration function is enabled. If the user disables the collaboration switch, the collaboration function is disabled.

In addition to supporting the collaboration function, the above camera modes may further include another function. In an example, functions provided in the photographing mode may further include but are not limited to intelligent object recognition, artificial intelligence (artificial intelligence, AI) photographing, a filter, and a flashlight. The intelligent object recognition function may identify attributes of a target, for example, identify food calories. The AI photographing function performs more targeted optimization on an image captured by the electronic device through a deep learning function of artificial intelligence. For example, during photographing, the AI photographing may prevent photo blurring caused by jitter, so that the captured image is more stable and clearer. The filter function can eliminate polarized light and smear. The flashlight function may be configured to enhance exposure.

In an example, functions provided in the recording mode further include but are not limited to multi-scene recording, a flashlight, and a filter. The multi-scene recording function may support recording a plurality of scenes at the same time.

In an example, functions provided in the movie mode may include but are not limited to a 4K high dynamic range (high-dynamic range, HDR), a flashlight, a slow motion, and a look up table (look up table, LUT). The 4K HDR function may support high-resolution and high-definition color image recording. The slow motion function supports variable speed recording, for example, allows a final obtained image to be played at a low speed. The LUT function may be configured to support the electronic device to adjust a tone of an output image.

The application framework layer provides an application programming interface (application programming interface, API) and a programming framework for applications in the application layer. The application framework layer includes some predefined functions. In an example of this application, referring to FIG. 7, the application framework layer may include a display status monitoring module, a system service module, a camera service module, a display management module, and a graphics drawing module. The display status monitoring module is configured to monitor a status of the foldable display, that is, to monitor whether the foldable display is in an unfolded state or a folded state. The system service module is configured to light up the inner display and/or the outer display based on an actual requirement. For example, when the foldable display is unfolded, the system service module lights up the inner display through an activity component. For another example, when collaborative display on the outer display is required, the camera application instructs the system service module to light up the outer display. In an embodiment, the system service module may include an activity manager service (activity manager service, AMS) or a window manager service (window manager service, WMS). The camera service module is configured to copy one framing content of the HAL layer into a plurality of framing contents. The graphics drawing module is configured to generate corresponding preview images based on each of the plurality of framing contents, and display the preview image corresponding to each framing content on the first display and the outer display respectively, thereby implementing the collaborative display. The display management module is configured to manage the outer display and the inner display. In this embodiment of this application, the display management module is configured to instruct the camera application through a manner for status callback when it is sensed that the outer display is lit after the collaboration function is enabled, so that the camera application refreshes the display status of the collaboration switch. For interaction between modules, reference may be made to embodiments below.

In an example of this application, the HAL layer includes a camera hardware management module. The camera hardware management module is configured to control a camera driver of the kernel layer to load a camera when a camera enabling instruction requesting to enable the camera is received from the application layer, thereby collecting data through the camera. In this way, the camera hardware management module may obtain the data collected by the camera. For example, after the camera application is enabled, the camera application transmits the camera enabling instruction to the camera hardware management module. After receiving the camera enabling instruction, the camera hardware management module controls the camera driver to load the camera. After the camera is enabled, the camera starts collecting a framing content, and the camera hardware management module obtains the framing content.

In an example of this application, a system composed of the display status monitoring module, the system service module, the camera service module, the display management module, the graphics drawing module, and the camera hardware management module may be referred to as an image display system. Certainly, the image display system may further include another function module related to preview image display. This is not specifically limited in this embodiment of this application.

The kernel layer is a layer between hardware and software. The kernel layer includes at least a display driver, a camera driver, an audio driver, and a sensor driver.

A working process of software and hardware of the electronic device 100 is described by using examples in combination with a captured photographing scenario.

When the touch sensor 180K receives a touch operation, a corresponding hardware interrupt is sent to the kernel layer. The kernel layer processes the touch operation into an original input event (including information such as coordinates of a touch and a time stamp of the touch operation). The original input event is stored in the kernel layer. The application framework layer obtains the original input event from the kernel layer, and recognizes a control corresponding to the original input event. For example, the touch operation is a single-tap operation and a control corresponding to the single-tap operation is a control of a camera application icon. The camera application invokes an interface of the application framework layer, so that the camera application is enabled. Then, the camera driver is enabled by invoking the kernel layer, and a static image or a video is captured by using the camera 193.

For ease of understanding, before a method provided in embodiments of this application is described in detail, based on the execution subject provided in the above embodiments, an application scenario involved in embodiments of this application is described below by using an example in which the electronic device is a mobile phone.

Figure 8A:
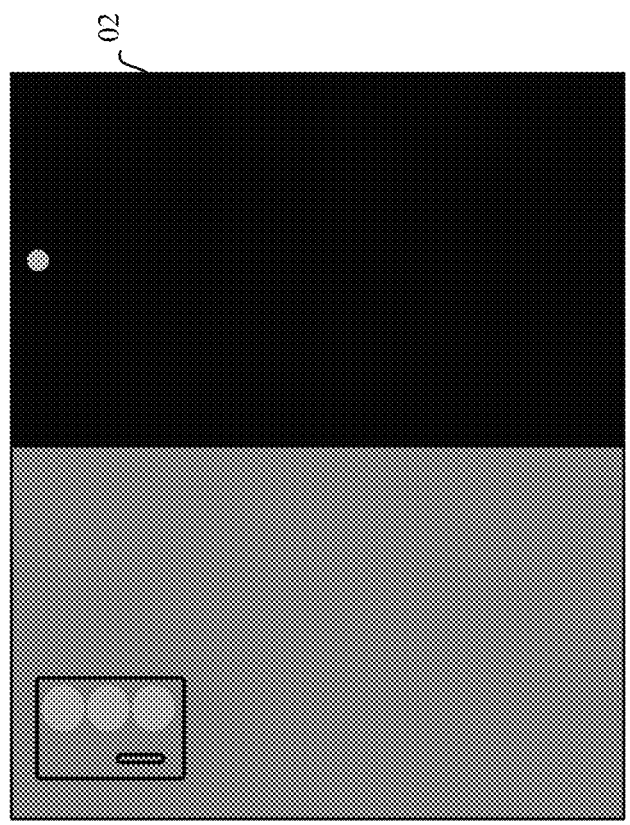
FIG. 8A, FIG. 8B, FIG. 8C, and FIG. 8D are schematic diagrams of collaborative display of an inner display and an outer display of an electronic device according to an example embodiment.
Figure 8B:
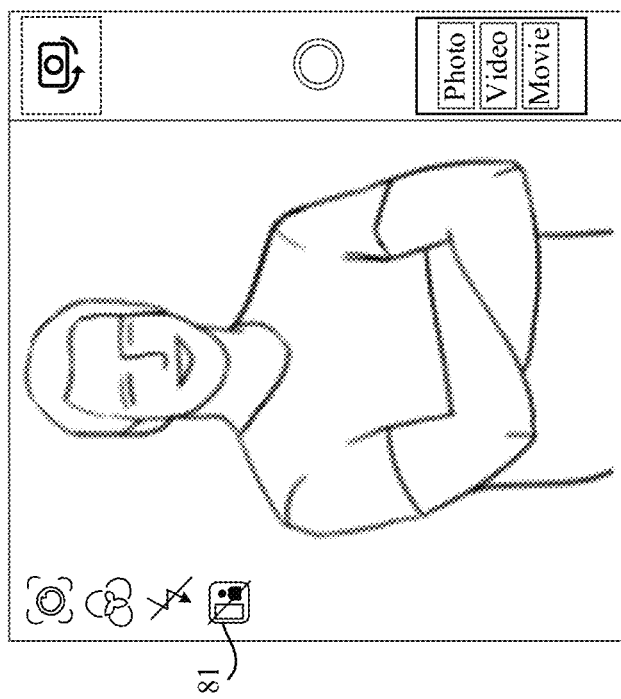

FIG. 8A, FIG. 8B, FIG. 8C, and FIG. 8D are schematic diagrams of an application scenario according to an example embodiment. In a possible scenario, when the user A wants to use the rear camera of the mobile phone to capture a photo of the user B, the foldable display of the mobile phone may be unfolded. The camera application is provided on the inner display of the mobile phone, and the user may tap an application icon of the camera application. The mobile phone enables the camera application in response to the trigger operation performed by the user on the camera application. After the camera application enables, the camera is enabled. In an example, the camera enabled by the mobile phone is the rear camera by default. As shown in FIG. 8A, when the mobile phone enables the camera, a preview image of the user B is displayed in a preview interface of the inner display 01. Referring to FIG. 8B, the outer display 02 of the mobile phone is in an off state. To be specific, the outer display 02 is not lit.

Figure 8C:
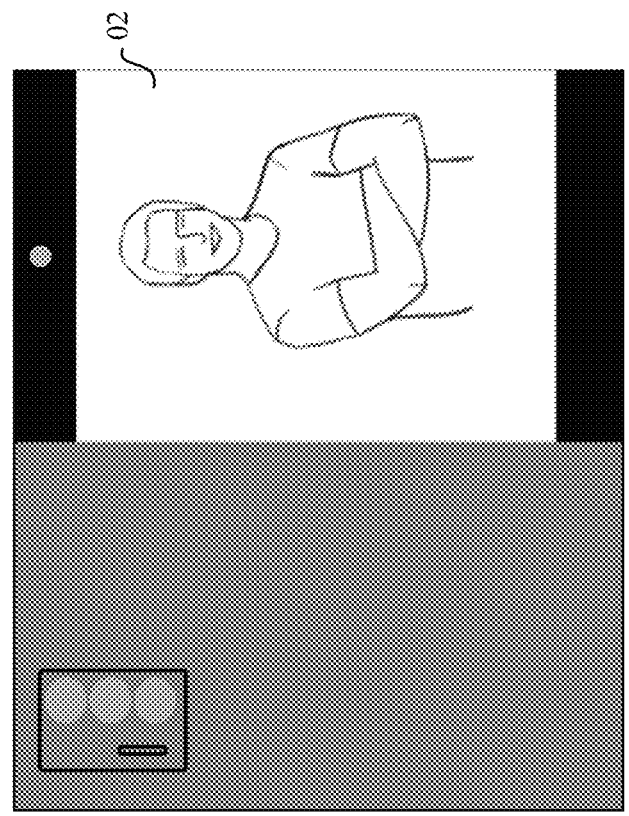
Figure 8D:
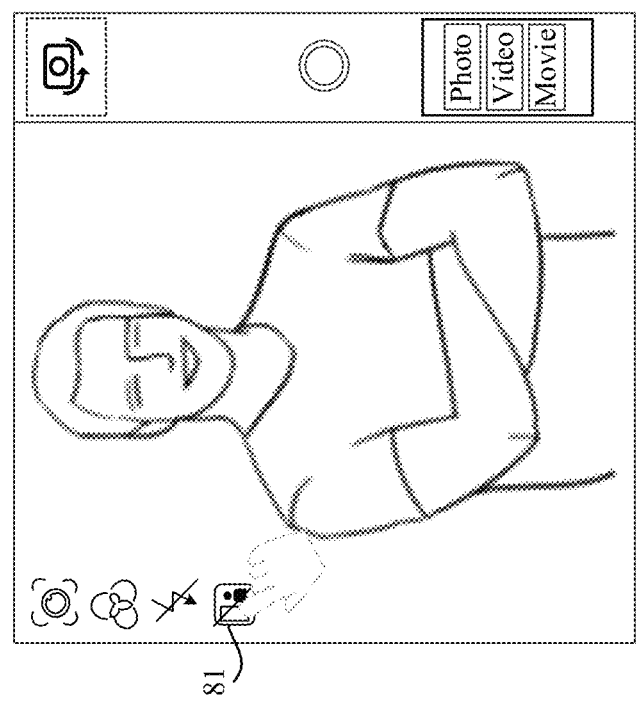

In an example, referring to FIG. 8C, when the foldable display of the mobile phone is in the unfolded state and the camera application enables the rear camera, the preview interface of the inner display 01 further displays a collaboration switch 81. When the user wants to enable the collaboration function, the user may trigger the collaboration switch 81. The mobile phone lights up the outer display 02 and displays the preview image of the user B on the outer display 02 in response to the triggering operation performed by the user on collaboration switch 81. For example, after the user triggers the collaboration switch, a display effect of the outer display 02 is shown in FIG. 8D.

Figure 9B:
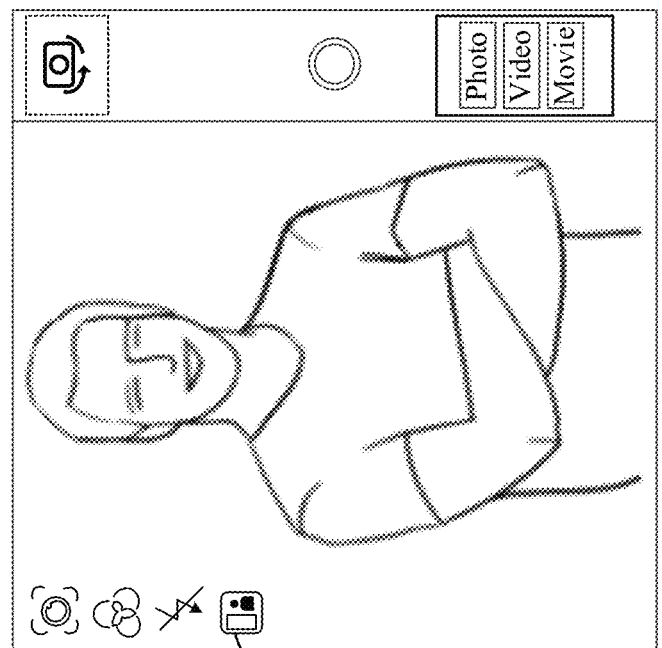
FIG. 9A and FIG. 9B are schematic diagrams of display of an inner display of an electronic device according to an example embodiment.
Figure 9A:
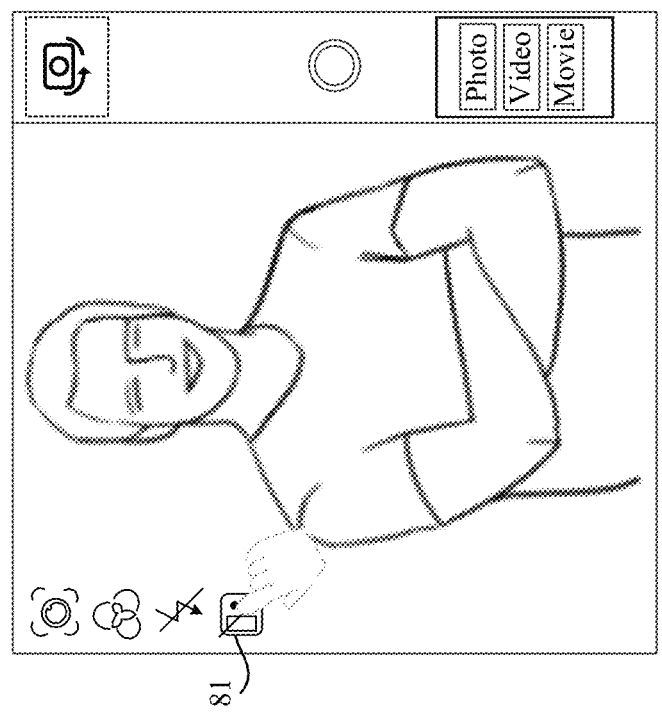

Referring to FIG. 9A and FIG. 9B, in an example, after the user triggers the collaboration switch 81 and the outer display 02 is lit, the mobile phone refreshes a display status of the collaboration switch 81. For example, in FIG. 9A, when the user enables the collaboration switch 81 and the mobile phone lights up the outer display 02, the display status of the collaboration switch 81 is shown in FIG. 9B.

In an example of this application, referring to FIG. 8A, FIG. 8B, FIG. 8C, and FIG. 8D or FIG. 9A and FIG. 9B, a camera mode option is further included in the inner display 01. For example, the camera mode option may include but is not limited to a photographing option, a video recording option, and a movie option. For example, in FIG. 8A, FIG. 8B, FIG. 8C, FIG. 8D, FIG. 9A, and FIG. 9B, the collaboration function is supported in the photographing mode. The collaboration function may alternatively be supported in another camera mode of the camera modes.

Figure 10B:
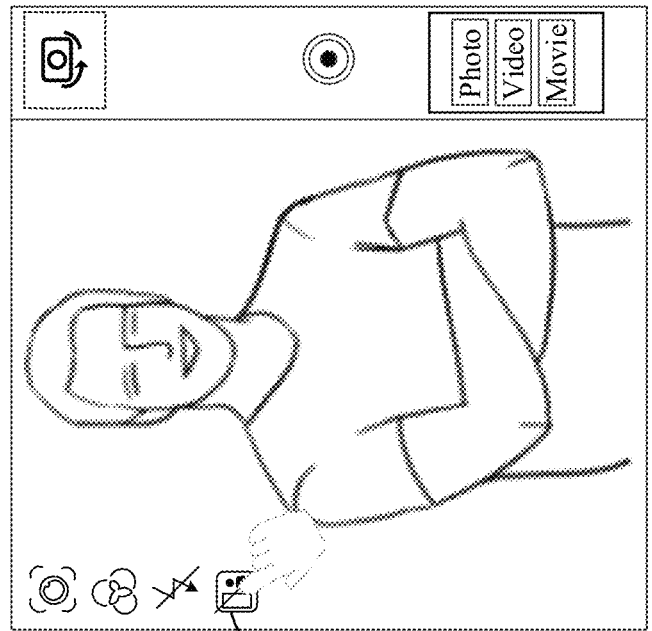
FIG. 10A, FIG. 10B, FIG. 10C, and FIG. 10D are schematic diagrams of an interface in a video mode according to an example embodiment.
Figure 10A:
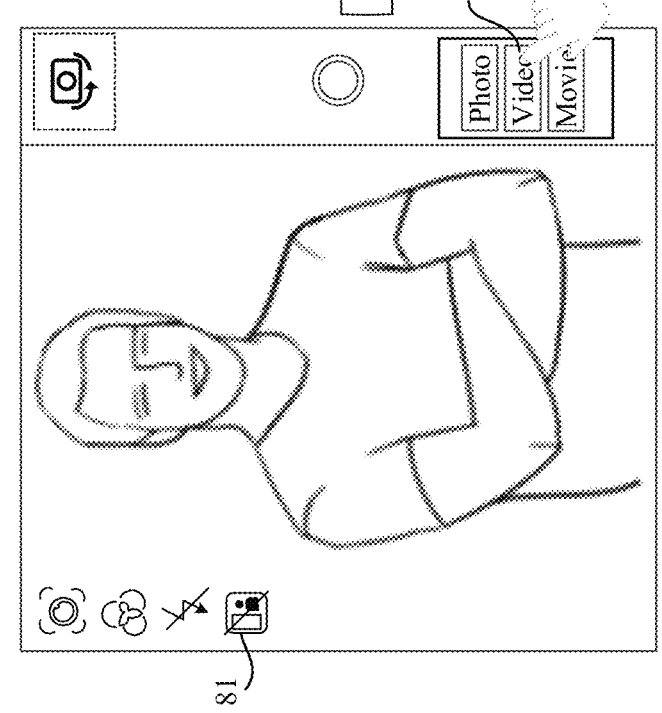
Figure 10C:
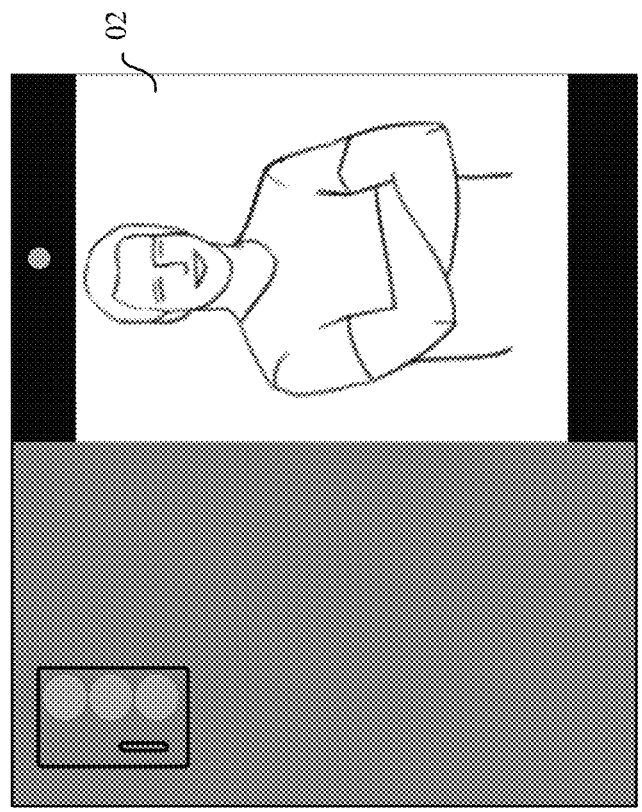
Figure 10D:
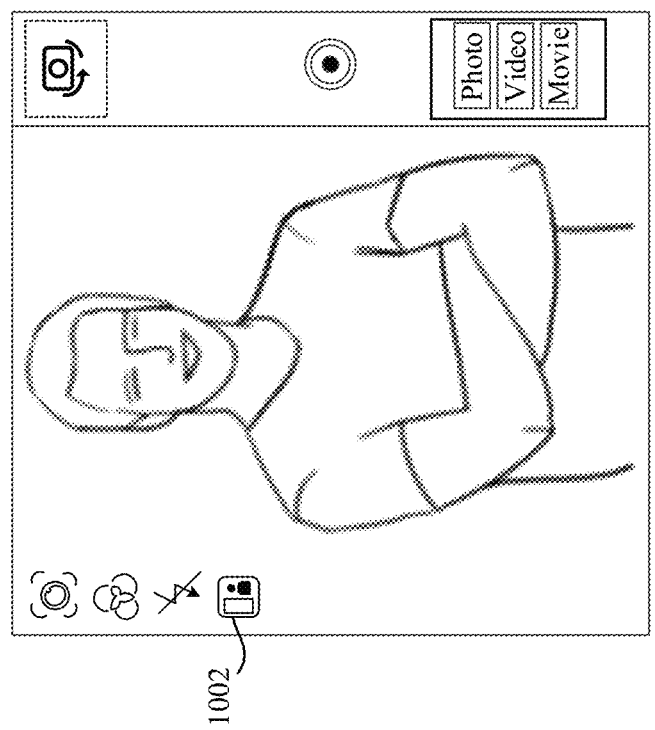

For example, FIG. 10A, FIG. 10B, FIG. 10C, and FIG. 10D are schematic diagram of an interface in a video mode according to an example embodiment. In an example, after the mobile photo enables the camera application, a preview interface in the photographing mode is usually entered by default. To be specific, a preview interface shown in FIG. 10A is usually entered. When the user wants to switch to the recording mode, a recording option 1001 may be triggered. The mobile phone enters a preview interface in the recording mode in response to the triggering operation performed by the user on the recording option 1001, for example, as shown in FIG. 10B. In the recording mode, when the user wants to enable the collaboration function, a collaboration switch 1002 may be triggered. For example, a display status of the enabled collaboration switch 1002 is shown in FIG. 10C. The mobile phone, in response to the triggering operation performed by the user on the collaboration switch 1002, lights up the outer display 02 and displays the preview image of the user B on the outer display 02, for example, as shown in FIG. 10D.

Figure 11C:
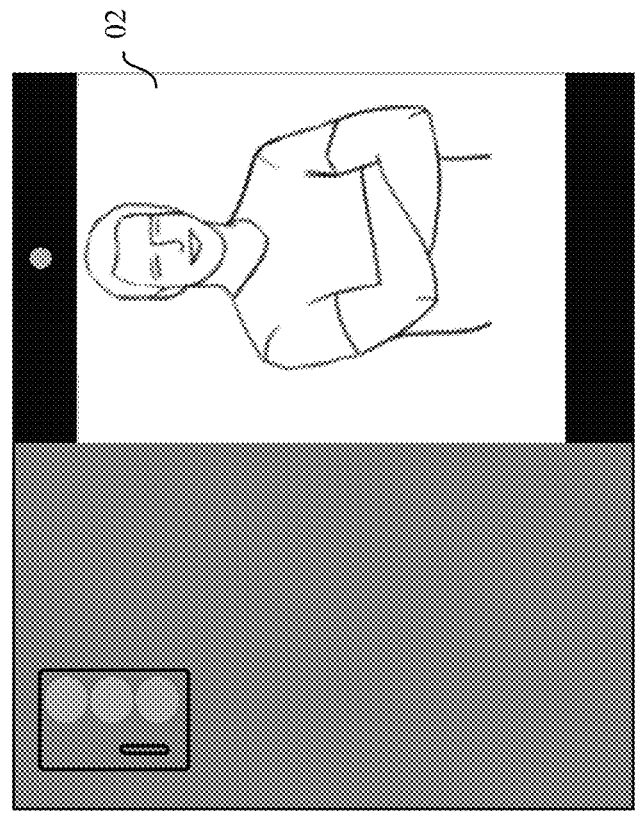
Figure 11D:
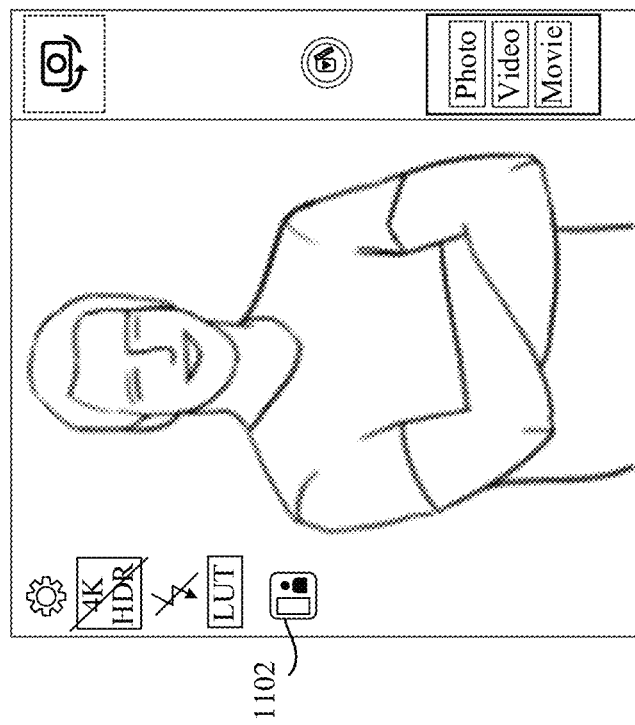

For another example, FIG. 11A, FIG. 11B, FIG. 11C, and FIG. 11D are schematic diagrams of an interface in a movie mode according to an example embodiment. In an example, after the mobile phone enables the camera application, a preview interface shown in FIG. 11A is usually entered by default. When the user wants to switch to the movie mode, a movie option 1101 may be triggered. The mobile phone enters a preview interface in the movie mode in response to the triggering operation performed by the user on the movie option 1101, for example, as shown in FIG. 11B. In the movie mode, when the user wants to enable the collaboration function, the user may trigger a collaboration switch 1102, to enable the collaboration switch 1102. For example, a display status of the enabled collaboration switch is shown in FIG. 11C. The mobile phone, in response to the triggering operation performed by the user on collaboration switch 1102, lights up the outer display 02 and displays the preview image of the user B on the outer display 02, for example, as shown in FIG. 11D.

It should be noted that FIG. 8A, FIG. 8B, FIG. 8C, FIG. 8D, FIG. 9A, and FIG. 9B merely show a plurality of camera modes as examples. In another embodiment, the camera mode may further include another mode, and the collaboration function may also be supported in the another mode. For example, the another mode may include but is not limited to a portrait mode. This is not limited in embodiments of this application.

In addition, it should be noted that if a first camera mode is switched to a second camera mode, and if the collaboration function is enabled in the first camera mode, that is, the collaboration switch is in an on state, the mobile phone directly enables the collaboration function after the second camera mode is entered. In other words, after the second camera mode is entered, the outer display 02 and the inner display 01 are collaboratively displayed directly in the second camera mode, and the collaboration switch is still in the on state. Therefore, the user does not need to manually trigger the collaboration switch to enable the collaboration function. The first camera mode is any camera mode that supports the collaboration function in the mobile phone, and similarly, the second camera mode is any camera mode that supports the collaboration function in the mobile phone.

Certainly, if the first camera mode is switched to the second camera mode, and if the collaboration function is disabled in the first camera mode, that is, the collaboration switch is in an off state, the mobile phone disables the collaboration function after the second camera mode is entered. In other words, after the second camera mode is entered, a preview image is only displayed on the inner display 01, and the collaboration switch is still in the off state. If the user wants to enable the collaboration function in the second camera mode, the user needs to trigger the collaboration switch.

Figure 12A:
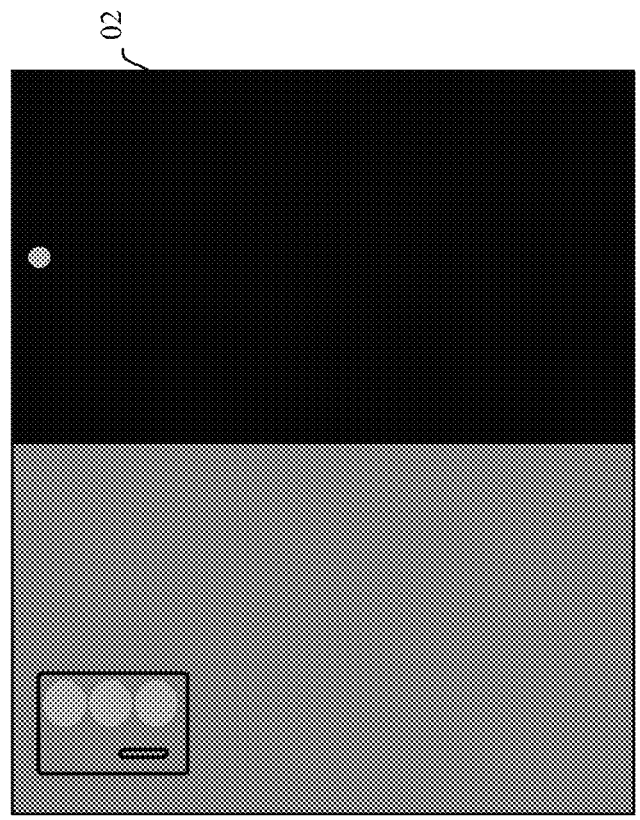
FIG. 12A and FIG. 12B are schematic diagrams of collaborative display of an inner display and an outer display of an electronic device according to another example embodiment.
Figure 12B:
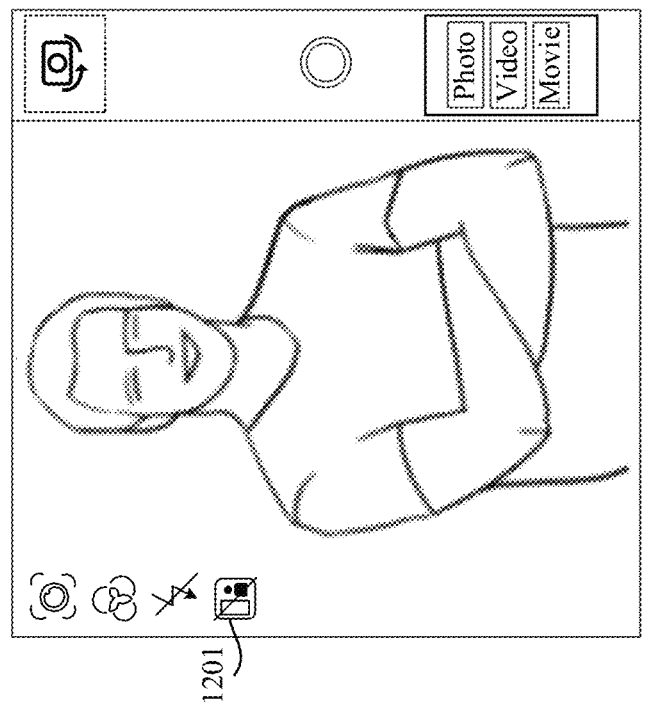

In an embodiment, for example, in the recording mode, when the user wants to disable the collaboration function, the collaboration switch may be triggered again, to disable the collaboration switch. For example, a display status of the collaboration switch after being disabled is shown in FIG. 12A. The mobile phone disables the outer display 02 in response to the triggering operation performed by the user on the collaboration switch. For example, as shown in FIG. 12B, the outer display 02 is in an unlit state.

In an embodiment, after the user selects another mode from the camera mode that does not support the collaboration function, the collaboration function of the mobile phone may be automatically disabled, and the outer display 02 of the mobile phone no longer displays the preview image on the inner display 01 of the mobile phone. For example, if the collaboration function only supports use of the rear camera for photographing, referring to FIG. 13A. When the user taps a lens flip option 1301, the mobile phone switches to enable the front camera. For example, as shown in FIG. 13B, the mobile phone enters a selfie mode. In this case, the collaboration function of the mobile phone is automatically disabled, and the mobile phone displays the preview image captured by the front camera only on the inner display 01, and does not display the preview image on the outer display. For example, when the mobile phone disables the outer display 02, the outer display 02 is in the unlit state. In addition, as shown in FIG. 13B, in a mode that the collaboration function is not supported, the preview interface of the inner display may not display the collaboration switch.

Figure 14B:
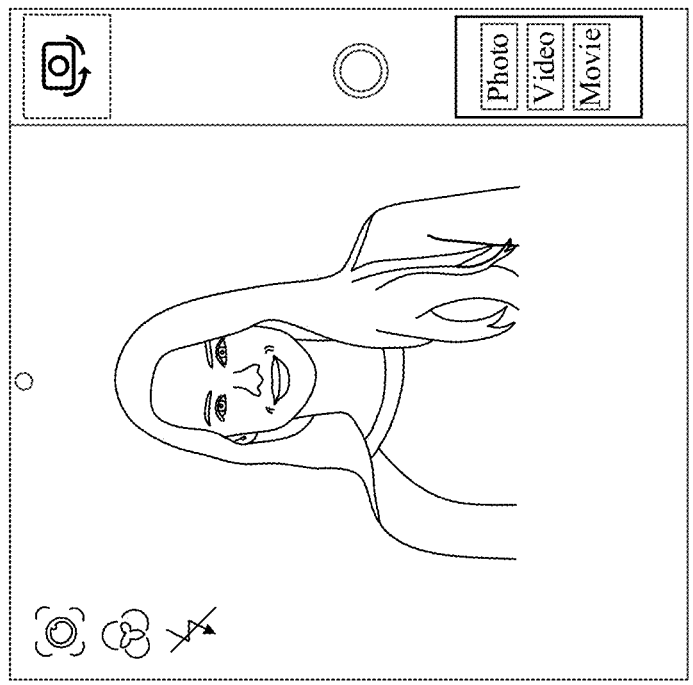
FIG. 14A and FIG. 14B are schematic diagrams of collaborative display of an inner display of an electronic device according to another example embodiment.
Figure 14A:
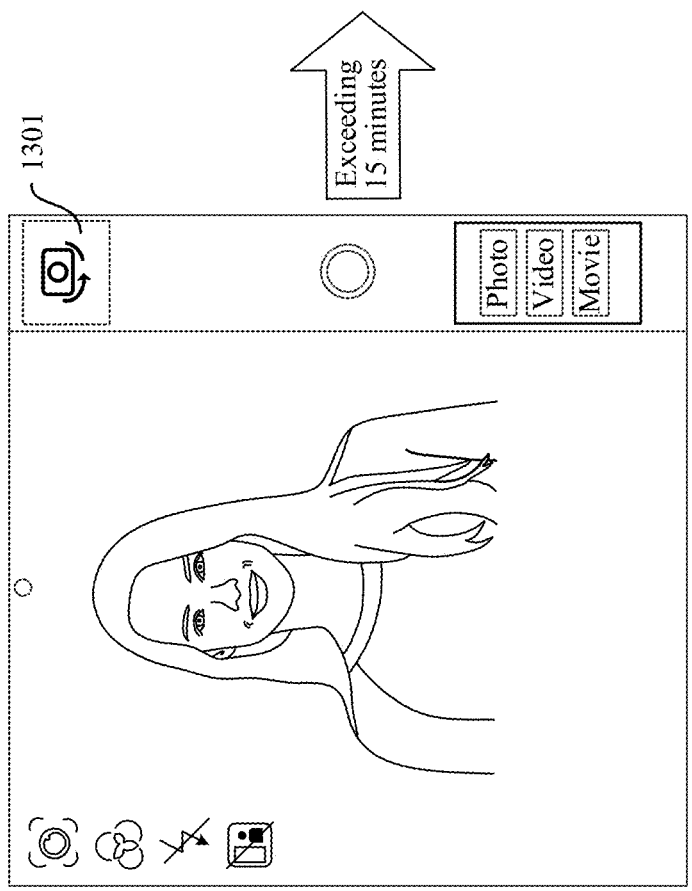

In another embodiment, after the mobile phone switches to the selfie mode, the collaboration switch may continue to be displayed on the inner display of the mobile phone in the selfie mode, so that the collaboration switch does not need to be displayed again when the rear camera is switched back in a short period of time. However, if the user accidentally touches the collaboration switch, because the selfie mode does not support the collaboration function, a black screen of the inner display of the mobile phone may be caused, which affects photographing experience of the user. In an example, to avoid a current camera mode being unavailable caused by accidentally touching the collaboration switch by the user, when the mobile phone detects that the user uses a camera mode that does not support the collaboration function for a long time (such as more than 15 minutes), as shown in FIG. 14A and FIG. 14B, the collaboration switch is no longer displayed on the inner display 01 of the mobile phone.

In an example, when the user taps the lens flip option 1301 again, the mobile phone switches to enable the rear camera. In this case, the mobile phone may control the foldable display to display the preview image based on an on/off state of the collaboration function in a last switch from the rear camera to the front camera. For example, if the collaboration function is enabled before the last switch, the mobile phone automatically enables the collaboration function after the rear camera is enabled at this time. In other words, the mobile phone displays the preview image of the user B on the inner display 01, and displays the collaboration switch on the inner display 01 and the collaboration switch is in the on state, and the mobile phone displays the preview image of the user B on the outer display 02. For another example, if the collaboration function is disabled before the last switch, the mobile phone disables the collaboration function after the rear camera is enabled at this time. In other words, the mobile phone displays the preview image of the user B only on the inner display 01, and displays the collaboration switch on the inner display 01 and the collaboration switch is in the off state. In addition, the outer display 02 is in the off state. To be specific, the outer display 02 is in the unlit state.

In another example, after the user taps the lens flip option 1301 again and the mobile phone switches to enable the rear camera, the mobile phone may disable the collaboration function by default. In other words, the mobile phone displays the preview image of the user B only on the inner display 01, and displays the collaboration switch on the inner display 01 and the collaboration switch is in the off state. If the user wants to enable the collaboration function, the user may enable the collaboration function by enabling the collaboration switch.

It should be noted that in the above description is provided by using an example in which the mobile phone disables the outer display 02 after the collaboration function is disabled, so that the outer display 02 is in the unlit state. In another embodiment, after the collaboration function is disabled, the mobile phone may not disable the outer display 02, but no longer collaboratively display the preview image of the user B on the outer display 02. For example, the mobile phone may display a standby picture on the outer display 02, for example, the standby picture includes information such as a date and time shown in 02 in FIG. 1. This is not limited in embodiments of this application.

In addition, during the collaborative display of the outer display 02 and the inner display 01, if the user adjusts a camera parameter on the inner display 01, the display of the outer display 02 and the display of the inner display 01 change synchronously. For example, when the user adjusts a focal length of 1 to a focal length of 1.8 on the inner display 01, a first preview image on the inner display 01 and a second preview image on the outer display 02 also change synchronously with the focusing operation.

In an example of this application, if it is detected that the camera application is disabled, the mobile phone disables the outer display or displays the standby picture in the outer display.

In an example of this application, when the user folds the foldable display of the mobile phone, the mobile phone no longer supports the collaboration function. In this case, the inner display 01 of the mobile phone is not displayed externally, only the outer display 02 is displayed externally. If the camera application is not disabled, refer to FIG. 5. In this case, the mobile phone uses the camera 04 as the front camera, and one of the camera 05, the camera 06, and the camera 07 is used as the rear camera.

Figure 15A:
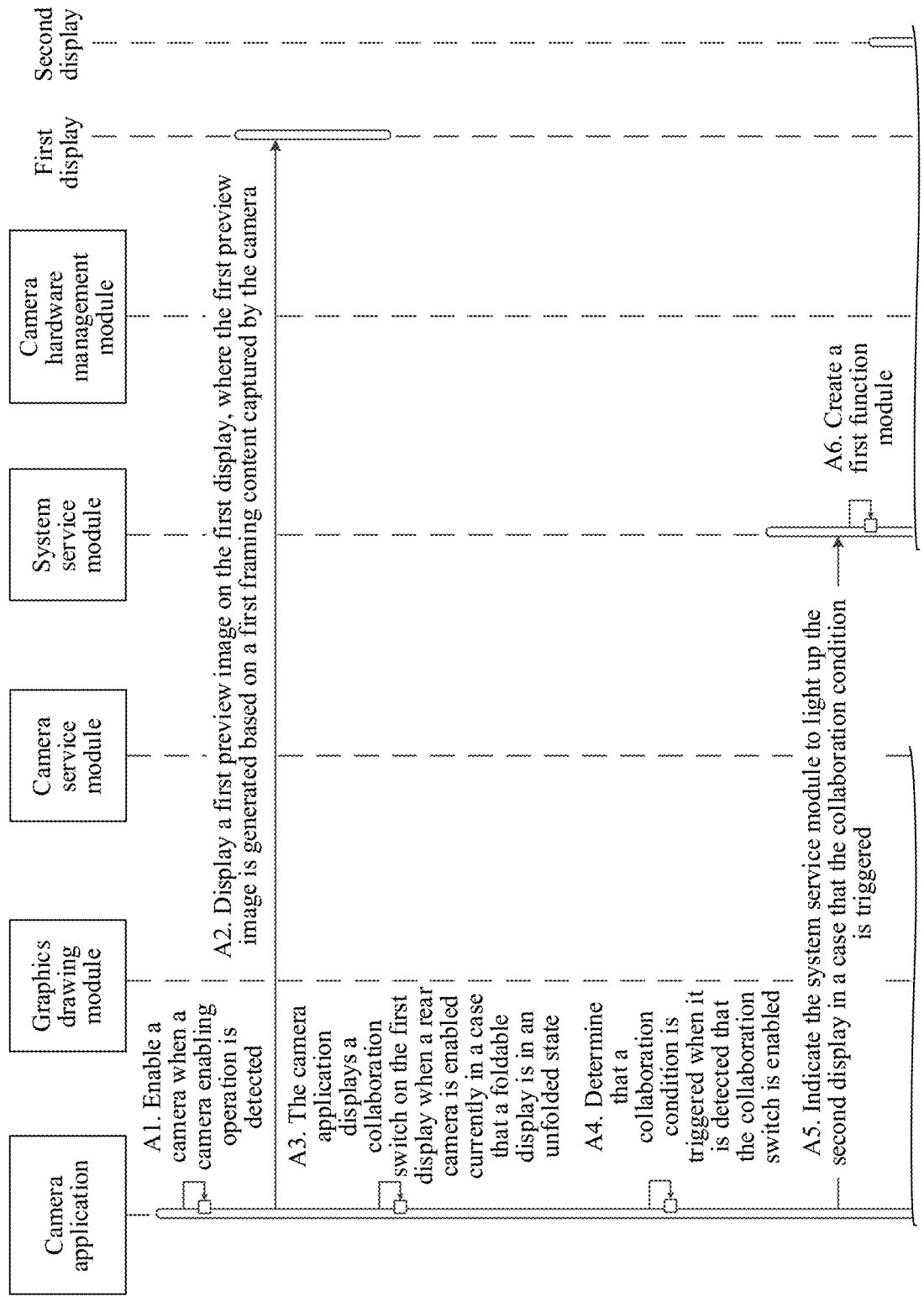
FIG. 15A and FIG. 15B are schematic flowcharts of displaying a preview image according to an example embodiment.
Figure 15B:
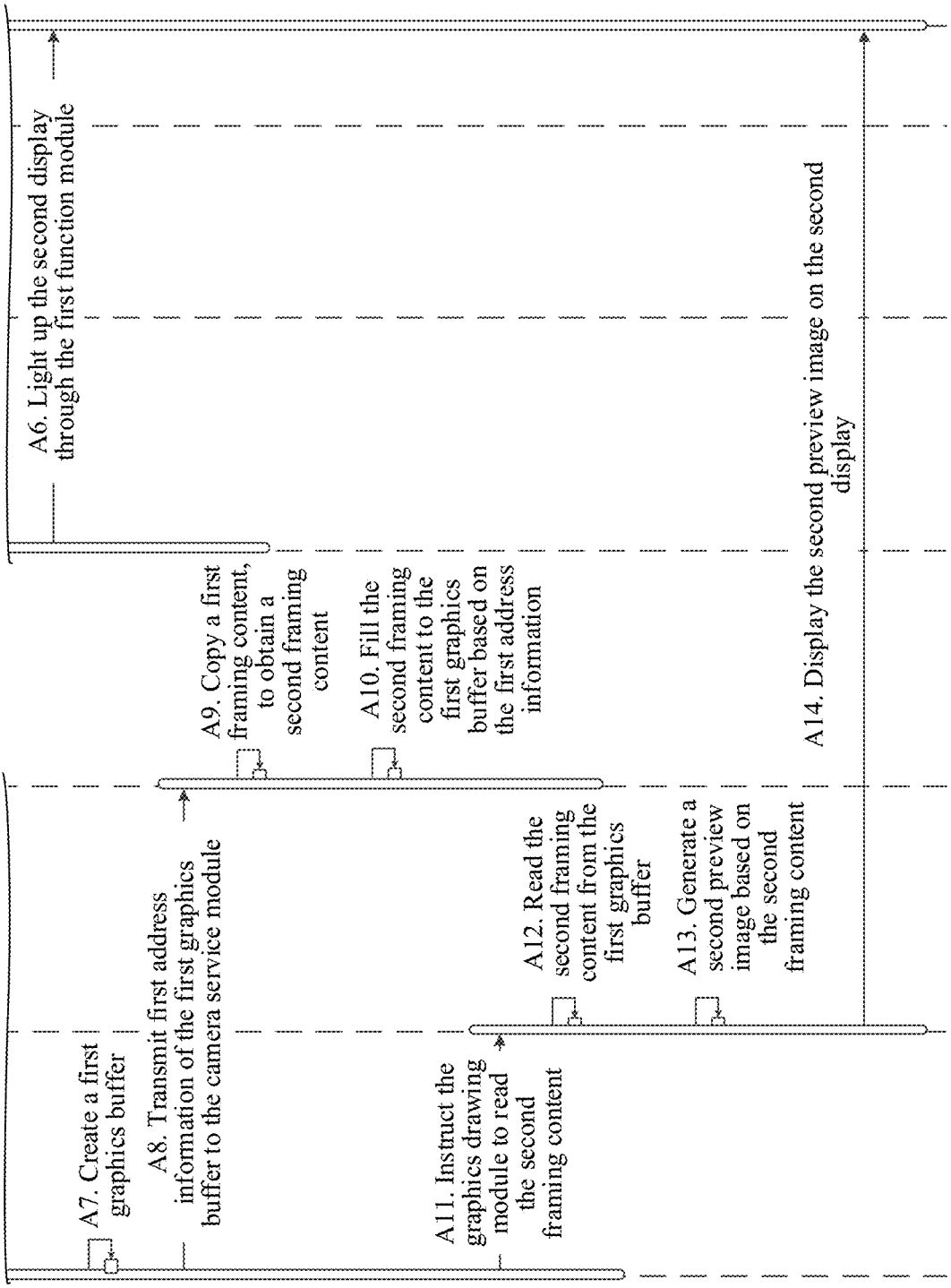

Based on the execution subject and the application scenarios provided in the above embodiments, the method for displaying a preview image provided in embodiments of this application is described in detail below. FIG. 15A and FIG. 15B are a schematic flowchart of a method for displaying a preview image according to an example embodiment. As an example rather than a limitation, this method is applicable to a mobile phone with a foldable display. The mobile phone is implemented through interaction between a plurality of modules shown in FIG. 7 as an example. The method may include some or all of the following contents:

Step A1: A camera application enables a camera in response to detecting a camera enabling operation.

In an example of this application, when a user wants to capture a photo by using the mobile phone, the user may fold the mobile phone. An application icon of the camera application is displayed on an inner display of the mobile phone, and the user may tap the application icon of the camera application. The mobile phone enables the camera application in response to the camera enabling operation performed on the application icon of the camera application by the user.

In an example of this application, after the camera application is enabled, a camera enabling instruction is transmitted to the camera hardware management module of the HAL layer. After receiving the camera enabling instruction, the camera hardware management module controls the camera driver to load the camera, and then the camera hardware management module receives data collected by the camera.

In an embodiment, the camera enabled by the mobile phone may be the front camera or the rear camera. For example, in a possible case, if the rear camera is used before the camera application is disabled by the mobile phone last time, the rear camera may be enabled by default after the camera application is enabled this time. In another possible implementation, if the front camera is used before the camera application is disabled by the mobile phone last time, the front camera may be enabled by default after the camera application is enabled this time. In still another possible implementation, the user may adjust the camera to the rear camera based on an actual requirement.

In an example of this application, after the camera application is enabled, a registration request may also be transmitted to the display status monitoring module through the camera application. The registration request is used for requesting monitoring of a state of the foldable display. In this way, first indication information is transmitted to the camera application when it is monitored through the display status monitoring module that the foldable display is in the unfolded state, where the first indication information is used for indicating that the foldable display is in the unfolded state.

In an example, the unfolded state is that a folding angle of the foldable display is greater than a preset angle threshold and is less than or equal to 180 degrees. The preset angle threshold may be set based on an actual requirement. Setting of the preset angle threshold needs to enable a photographed user to see the preview interface on the second display during photographing. For example, the preset angle threshold may be 150 degrees.

In another example, the unfolded state is that the folding angle of the foldable display is 180 degrees.

Step A2: Display a first preview image on the first display, where the first preview image is generated based on a first framing content collected by the camera.

Figure 16:
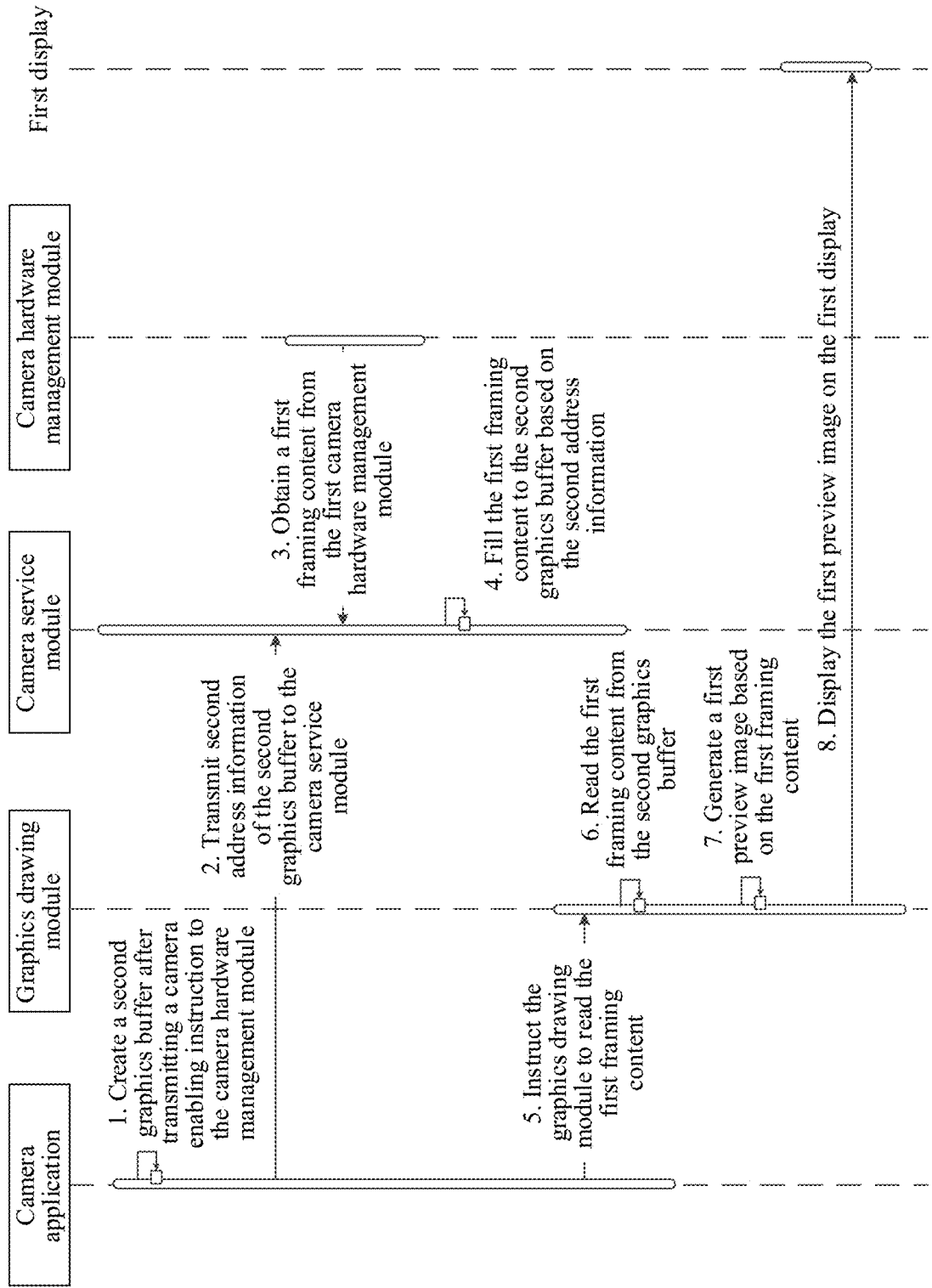
FIG. 16 is a schematic flowchart of a method for displaying a first preview image according to an example embodiment.

In an example, FIG. 16 is a schematic flowchart of displaying a first preview image according to an example embodiment. The process mainly includes the following sub-steps: 1. After the camera application transmits the camera enabling instruction to the camera hardware management module, a second graphics buffer is created, where the second graphics buffer is configured to store a framing content of a preview image to be displayed on the first display. 2. The camera application transmits second address information of the second graphics buffer to the camera service module. 3. The camera service module obtains the first framing content from the first camera hardware management module. 4. The camera service module fills the first framing content to the second graphics buffer based on the second address information. 5. The camera application instructs the graphics drawing module to read the first framing content. 6. The graphics drawing module reads the first framing content from the second graphics buffer. 7. The graphics drawing module generates the first preview image based on the first framing content. 8. The graphics drawing module displays the first preview image on the first display.

In an example of this application, the camera application adds the second address information to target configuration information, to transmit the second address information to the camera service module through the target configuration information. For example, the target configuration information may be Preview OutputConfiguration.

In an example of this application, the graphics drawing module is a module derived during the creation of the second graphics buffer, which may be configured to generate the first preview image based on the first framing content and display the first preview image on the first display. In addition, when the collaboration function is subsequently enabled, the graphics drawing module is further configured to generate the second preview image based on a second framing content and display the second preview image on the second display. Details may be referred to descriptions below.

Step A3: The camera application displays the collaboration switch on the first display if the rear camera is enabled currently when the foldable display is in the unfolded state.

The collaboration switch is configured to control whether a function of synchronously displaying the first preview image on the second display is enabled.

As described above, the camera application is registered to monitor the status of the foldable display after enabling. The first indication information is transmitted to the camera application when it is monitored through the display status monitoring module that the foldable display is in the unfolded state. The first indication information is used for indicating that the display is in the unfolded state. The camera application determines that the foldable display is in the unfolded state when the first indication information is received.

In an example of this application, in a case that the foldable display is in the unfolded state, if the rear camera is enabled currently, it indicates that the user may need to use the collaboration function. Therefore, the camera application displays the collaboration switch on the first display, so that the user may enable the collaboration function through the collaboration switch if necessary. For example, the collaboration switch displayed in the preview interface of the camera application is shown at 81 in FIG. 8A, FIG. 8B, FIG. 8C, and FIG. 8D.

Step A4: Determine that a collaboration condition is triggered when the camera application detects that the collaboration switch is enabled.

The collaboration condition is a condition of synchronously displaying the first preview image on the second display.

In an example, the collaboration switch is enabled by the user (for example, a photographing user). In this case, it indicates that the user wants the mobile phone to display the first preview image on the first display in collaboration with the second display, therefore the mobile phone determines that the collaboration condition is triggered.

It should be noted that step A3 and step A4 are an optional implementation for determining whether the collaboration condition is triggered. In another embodiment, the determining whether the collaboration condition is triggered may further include another possible implementation. For example, in a possible implementation, when the foldable display is in the unfolded state, the camera application displays the collaboration switch on the first display. If it is detected that the collaboration switch is enabled, it is determined that the collaboration condition is triggered. In other words, a case in which the collaboration function is used only when the rear camera of the mobile phone is enabled may not be limited, and the collaboration function may be used when the front camera is enabled. For another example, in another possible implementation, in a case that the foldable display is in the unfolded state, if the rear camera is enabled currently and a facial image is detected through an image detection technology, it indicates that a person is currently being photographed. In this case, the collaboration function may usually be configured to enable the photographed user to see the preview image of the photographed user, therefore it may be determined that the collaboration condition is triggered.

As an example rather than a limitation, for the above another possible implementation, that is, in the implementation of determining that the collaboration condition is triggered through the facial detection, after the facial image is detected and before the determining that the collaboration condition is triggered, the camera application may further display a prompt message such as "agree to enable the collaboration function or not". When a confirmation instruction is received based on the prompt message, it indicates that the user allows enabling the collaboration function, and in this case, it is determined that the collaboration condition is triggered. If a cancellation instruction is received based on the prompt message, it indicates that the user does not allow enabling the collaboration function. In this case, it is determined that the collaboration condition is not triggered. In this case, the mobile phone merely displays the first preview image on the first display. In this way, through display of the prompt message, trouble caused by the mobile phone automatically enabling the collaboration function when the user does not want to enable the collaboration function may be avoided. In addition, when the user does not want to use the collaboration function, the user may disable the camera application, to disable the collaboration function. Alternatively, the camera application may also display a disabled switch in the preview interface where the first preview image is located, and the user may disable the collaboration function through the disabled switch.

Step A5: The camera application indicates a system service module to light up the second display when the collaboration condition is triggered.

If the collaboration condition is triggered, it indicates that the user wants to synchronously display the first preview image on the first display on the second display. Therefore, the mobile phone lights up the second display. In an example, the camera application indicates the system service module to light up the second display.

Step A6: The system service module creates a first function module, to light up the second display through the first function module.

The first function module is merely configured to light up the second display. To be specific, the first function module does not include another function. In an example, the first function module is a collaboration presentation module.

It should be noted that the above step A5 and step A6 are an optional implementation for lighting up the second display when the collaboration condition is triggered. In the above implementation, the first function module dedicated to light up the second display is created, to light up the second display through the first function module and increase a lighting speed of the second display.

In an example of this application, after the second display is lit, the display management module instructs the camera application that the second display is lit. In this case, the camera application refreshes the display status of the collaboration switch, that is, the display status of the collaboration switch is updated to the on state. For example, the display status of the collaboration switch after refreshing is shown in FIG. 9B.

Step A7: The camera application creates a first graphics buffer.

The first graphics buffer is configured to store a framing content of a preview image to be displayed on the second display.

When the collaboration condition is triggered, it indicates that the second preview image with the same content as the first preview image needs to be displayed on the second display. Based on the above, the camera application creates the first graphics buffer configured to store the second framing content of the second preview image.

Step A8: The camera application transmits first address information of the first graphics buffer to the camera service module.

In an example, the camera application adds the first address information to target configuration information, to transmit the first address information to the camera service module through the target configuration information. For example, the target configuration information is the Preview OutputConfiguration.

Step A9: The camera service module copies the first framing content, to obtain the second framing content.

It should be noted that the first framing content may generally be a framing content obtained from the camera hardware management module before being copied by the camera service module. Correspondingly, the second framing content may be the framing content obtained after copying the first framing content.

It is easily understood that the first framing content is obtained by the camera service module from the camera hardware management module. To synchronize with the first preview image on the first display, the camera service module copies the first framing content.

Step A10: The camera service module fills the second framing content to the first graphics buffer based on the first address information.

In other words, the camera service module determines a location of the first graphics buffer based on the first address information, and then fills the second framing content into the first graphics buffer.

Step A11: The camera application instructs the graphics drawing module to read the second framing content.

Because the first graphics buffer is created by the camera application, the camera application may perceive that the second framing content is written in the first graphics buffer. Then, the camera application instructs the graphics drawing module to read the second framing content. For example, the camera application may transmit a content reading instruction to the graphics drawing module. The content reading instruction is used for instructing the graphics drawing module to read the second framing content from the first graphics buffer.

Step A12: The graphics drawing module reads the second framing content from the first graphics buffer.

For example, after receiving the content reading instruction of the camera application, the graphics drawing module reads the second framing content from the first graphics buffer.

Step A13: The graphics drawing module generates the second preview image based on the second framing content.

Step A14: The graphics drawing module displays the second preview image on the second display.

It should be noted that step A10 and step A14 are an optional implementation for displaying the second preview image on the second display, and does not constitute a limitation on a specific implementation thereof. In other words, another implementation may be used in another embodiment.

Figure 17:
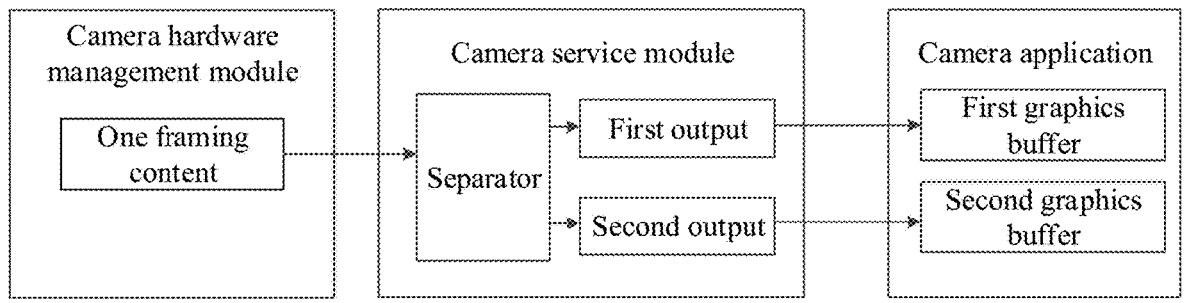
FIG. 17 is a schematic diagram of an inter-module interaction according to an example embodiment.

Then, whenever the camera application requests to obtain a preview image, the camera application transmits a preview image obtaining request to the camera service module. Referring to FIG. 17, after receiving the preview image acquisition request, the camera service module obtains a framing content from the camera hardware management module. Subsequently, the camera service module copies the obtained framing content, to obtain two framing contents. The camera service module fills one framing content to the first graphics buffer based on the first address information, and fills the other framing content to the second graphics buffer based on the second address information. In other words, it may be understood that the camera service module includes a separator, and is configured to divide one first framing content obtained from the camera hardware management module into two first framing contents and respectively store in the first graphics buffer and the second graphics buffer. In this way, the camera application may instruct the graphics drawing module. The graphics drawing module reads the framing content from the first graphics buffer and the second graphics buffer respectively, and generates corresponding preview images based on each of the two read framing contents, and then respectively displays the preview images on the inner display and the outer display.

In this embodiment of this application, the camera application enables a camera in response to detecting a camera enabling operation, and then displays the first preview image on the first display. The first preview image is generated based on the first framing content collected by the camera. When the collaboration condition is triggered, it indicates that the user needs to synchronously display the first preview image on the second display. Therefore, the second display is lit. Then the first framing content is copied, to obtain the second framing content. The second preview image is generated based on the second framing content, and it is easily understood that the second preview image is the same as the first preview image. Afterward, the second preview image is displayed on the second display. In this way, the preview image is synchronously displayed on the inner display and the outer display of the electronic device, which adds a manner for displaying the preview image, so that a user located on the front of the electronic device and a user located on the back of the electronic device can simultaneously see the preview image, thereby improving photographing experience of the user.

Figure 18:
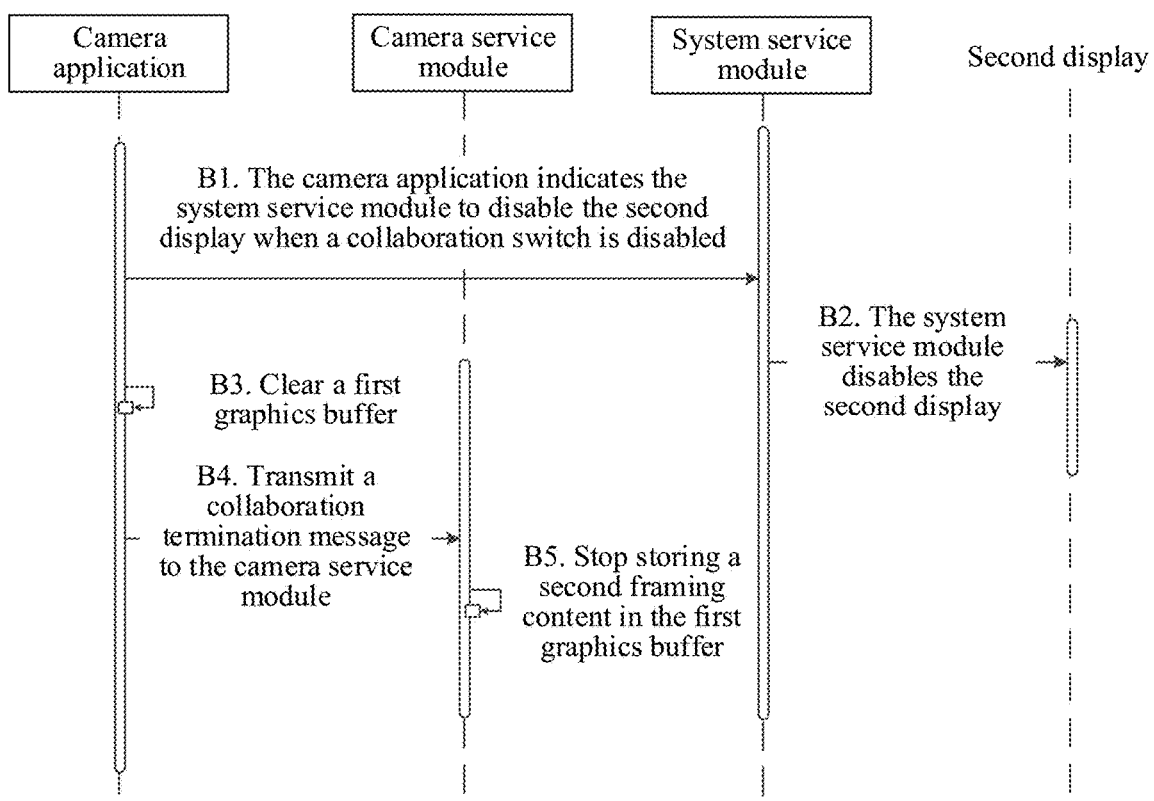
FIG. 18 is a schematic flowchart of disabling a collaboration function according to an example embodiment.

In an example of this application, the collaboration function may be disabled during cooperation. FIG. 18 is a schematic flowchart of disabling a collaboration function according to an example embodiment. For example, the user may disable the collaboration function by disabling the collaboration switch. As an example rather than a limitation, this method is applicable to a mobile phone and the mobile phone is implemented through interaction between a plurality of modules shown in FIG. 7. The method may include the following contents.

Step B1: The camera application instructs the system service module to turn off the second display when the collaboration switch is disabled.

Referring to FIG. 11B, in a possible case, when the user no longer wants to use the collaboration function, the collaboration switch 1102 may be triggered to disable the collaboration function. The camera application notifies the system service module when detecting that the collaboration switch 1102 is disabled.

Step B2: The system service module disables the second display.

In an example, after receiving a notification transmitted by the camera application instructing disabling of the second display, the system service module disables the second display through the first function module, and deletes the first function module.

In an example of the present application, the display management module instructs the camera application after detecting that the second display is disabled. Correspondingly, the camera application refreshes a display status of the collaboration switch 1102, that is, updates the display status of the collaboration switch 1102 to the off state.

Step B3: The camera application clears the first graphics buffer.

The camera application clears data in the first graphics buffer, and releases the first graphics buffer. If the coordination display is required next time, the camera application recreates the first graphics buffer.

Step B4: The camera application transmits a collaboration termination message to the camera service module.

The collaboration termination message is used for instructing to stop storing the second framing content in the first graphics buffer.

In an example, the camera application may update the target configuration information (for example, Preview OutputConfiguration). The updated target configuration information no longer carries the first address information. Then, the camera application transmits the updated target configuration information as the collaboration termination message to the camera service module.

Step B5: The camera service module stops storing the second framing content in the first graphics buffer.

Specifically, the camera service module no longer copies the first framing content obtained from the camera hardware management module, and no longer stores the second framing content in the first graphics buffer. Because the camera application still runs, the camera service module still stores the first framing content in the second graphics buffer.

In this way, the mobile phone ends the collaborative display process through the above interaction process.

It should be noted that the above steps are not performed in a strictly sequence. In an example, the above steps may be performed in parallel. This is not limited in embodiments of this application.

In an embodiment, if the camera application is disabled, it indicates that the camera application no longer uses the camera. In this case, the mobile phone follows the above process to disable the collaboration function. In addition, the camera application transmits a camera disabling instruction to the camera hardware management module. After receiving the camera disabling instruction, the camera hardware management module controls the camera driver to disable the camera. The camera hardware management module stops obtaining data from the camera.

In an embodiment, because the display status monitoring module is configured to monitor the status of the foldable display, and the camera application is registered monitoring with the display status monitoring module, when the display status monitoring module monitors that the foldable display is in the folded state, the display status monitoring module instructs the camera application. The camera application disables the collaboration function after determining that the foldable display is in the folded state, but the camera application does not instruct the system service module to turn off the second display. In this case, the mobile phone disables the first display and uses the second display as a main display. In this case, the graphics drawing module displays the first preview image on the second display after generating the first preview image.

Figure 13A:
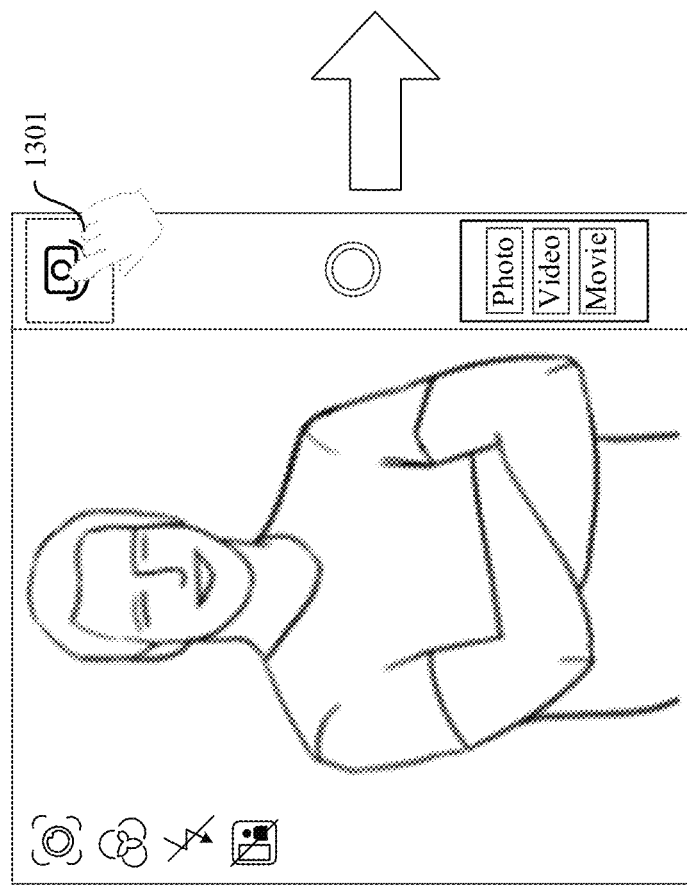
FIG. 13A and FIG. 13B are schematic diagrams of collaborative display of an inner display of an electronic device according to another example embodiment.
Figure 13B:
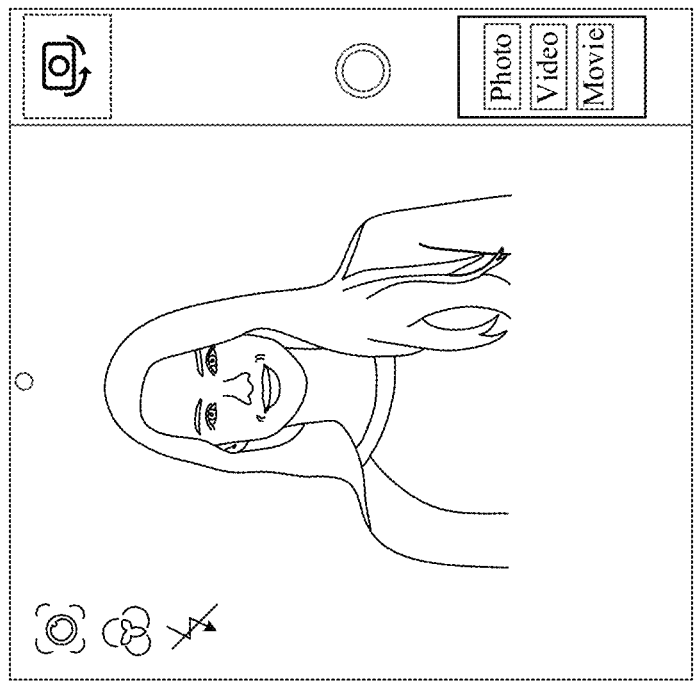

In an embodiment, if the camera application detects that a camera mode used currently does not support the collaboration function, for example, as shown in FIG. 13A and FIG. 13B, the user taps the lens flipping option 1301 to enable the mobile phone to enter in the selfie mode, the collaborative display also needs to be terminated. In this case, the camera application may trigger the mobile phone to disable the collaboration function based on the above process.

In an embodiment, when the camera application detects a focusing operation performed by the user, an adjusted focal length may be transmitted to the camera hardware management module. Therefore, before the camera service module obtains the first framing content from the camera hardware management module, the camera hardware management module adjusts data obtained from the camera based on the adjusted focal length, and then uses adjusted data as the first framing content, for the camera service module to obtain.

In this embodiment of this application, if it is detected that the collaboration function is disabled during the collaborative display, the mobile phone releases the first graphics buffer, which can save memory resources. In addition, when the second display is not required, the mobile phone may turn off the second display to save hardware resources.

Figure 19:
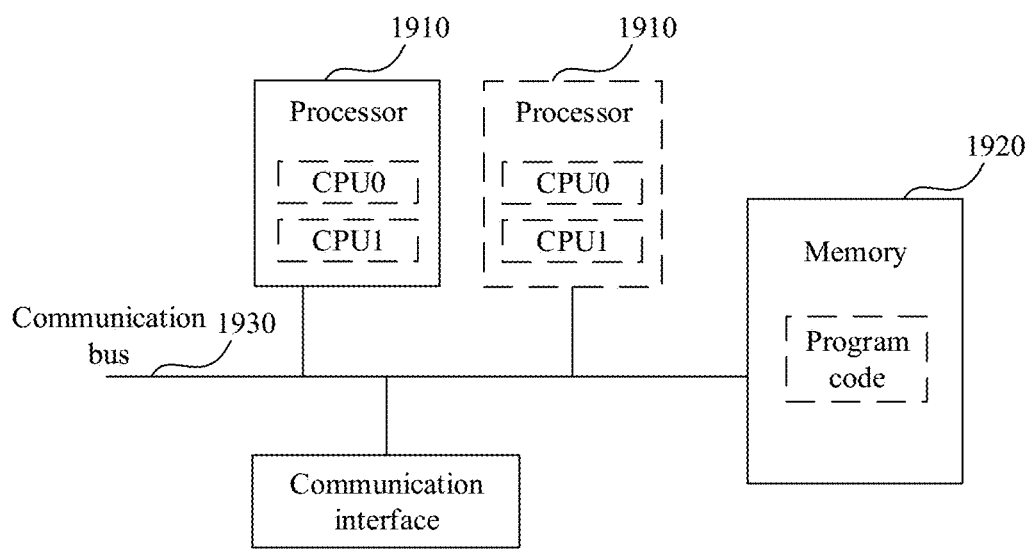
FIG. 19 is a schematic diagram of a structure of an apparatus for displaying a preview image according to an example embodiment.

FIG. 19 is a schematic structural diagram of an apparatus for displaying a preview image according to an example embodiment. The apparatus may be implemented by using software, hardware, or a combination of software and hardware as a part or an entirety of a computer device. The computer device may be the electronic device shown in FIG. 6. Referring to FIG. 19, a structure of the apparatus includes a processor 1910 and a memory 1920. One or more processors 1910 may be arranged. The memory 1910 is configured to store a program supporting the apparatus for displaying a preview image to perform the method provided in the above embodiments, and store data during implementing the method described in the above embodiments. The apparatus may further include a communication bus 1930. The communication bus 1930 is configured to establish a connection between the processor 1910 and the memory 1920. The processor 1910 is configured to:
  enable a camera in response to detecting a camera enabling operation;
  display a first preview image on the first display, where the first preview image is generated based on a first framing content collected by the camera;
  light up the second display in a case that a collaboration condition is triggered, where the collaboration condition is a condition of synchronously displaying the first preview image on the second display;
  copy the first framing content to obtain a second framing content;
  generate a second preview image based on the second framing content; and
  display the second preview image on the second display.

In an example of this application, the electronic device includes an image display system. The processor 1910 is configured to:
  create a first function module through the image display system when the collaboration condition is triggered, where the first function module is configured to light up the second display; and
  light up the second display through the first function module.

In an example of this application, the image display system includes a camera service module and a camera hardware management module. The processor 1910 is configured to:
  copy the first framing content through the camera service module, to obtain the second framing content, where the first framing content is obtained from the camera by the camera hardware management module; and
  add the second framing content to a first graphics buffer through the camera service module, where the first graphics buffer is created by the camera application when it is determined that the collaboration condition is triggered, and the first graphics buffer is configured to store a framing content of a preview image to be displayed on the second display.

In an example of this application, the processor 1910 is further configured to:
  create the first graphics buffer through the camera application when the collaboration condition is triggered; and
  transmit first address information of the first graphics buffer to the camera service module through the camera application.

The adding the second framing content to a first graphics buffer through the camera service module includes:
  adding the second framing content to the first graphics buffer based on the first address information through the camera service module.

In an example of this application, the image display system further includes a graphics drawing module. The processor 1910 is further configured to:
  instruct the graphics drawing module to read the second framing content through the camera application when it is determined through the camera application that the first graphics buffer includes the second framing content;
  read the second framing content from the first graphics buffer through the graphics drawing module; and
  generate the second preview image based on the second framing content through the graphics drawing module.

The displaying the second preview image on the second display includes:
  displaying the second preview image on the second display through the graphics drawing module.

In an example of this application, the processor 1910 is further configured to:
  display a collaboration switch on the first display through the camera application when the foldable display is in an unfolded state and a rear camera is currently enabled, where the collaboration switch is configured to control whether to enable a function of synchronously displaying the first preview image on the second display; and determine that the collaboration condition is triggered when it is detected through the camera application that the collaboration switch is enabled.

In an example of this application, the unfolded state is that a folding angle of the foldable display is greater than a preset angle threshold and less than or equal to 180 degrees.

In an example of this application, the image display system further includes a display status monitoring module. The processor 1910 is further configured to:

transmit a registration request to the display status monitoring module through the camera application, where the registration request is used for requesting to monitor a state of the foldable display;

control the display status monitoring module to transmit first indication information to the camera application when it is monitored through the display status monitoring module that the foldable display is in the unfolded state, where the first indication information is used for indicating that the display is in the unfolded state; and determine that the foldable display is in the unfolded state based on the first indication information through the camera application.

In an example of this application, the processor 1910 is further configured to:

release the first graphics buffer through the camera application when it is detected through the camera application that the collaboration switch is disabled;

transmit a collaboration termination message to the camera service module through the camera application, where the collaboration termination message is used for instructing to stop storing the second framing content in the first graphics buffer; and control the camera service module to stop storing the second framing content in the first graphics buffer after the collaboration termination message is received.

In an example of this application, the processor 1910 is further configured to:

control the first function module to turn off the second display through the image display system when it is detected through the camera application that the collaboration switch is disabled.

In this embodiment of this application, the camera application enables a camera in response to detecting a camera enabling operation, and then displays the first preview image on the first display. The first preview image is generated based on the first framing content collected by the camera. When the collaboration condition is triggered, it indicates that the user needs to synchronously display the first preview image on the second display. Therefore, the second display is lit. Then the first framing content is copied, to obtain the second framing content. The second preview image is generated based on the second framing content, and it is easily understood that the second preview image is the same as the first preview image. Afterward, the second preview image is displayed on the second display. In this way, the preview image is synchronously displayed on the inner display and the outer display of the electronic device, which adds a manner for displaying the preview image, so that a user located on the front of the electronic device and a user located on the back of the electronic device can simultaneously see the preview image, thereby improving photographing experience of the user.

It should be noted that, for preview image displaying by the apparatus for displaying a preview image provided in the above embodiments, only division of the function modules is described by using examples. In a practical application, the functions are completed by different function modules as required. In other words, an internal structure of the apparatus is divided into different function modules to complete all or a part of the functions described above.

Functional units and modules in the embodiments may be integrated into one processing unit, or each unit may exist physically alone, or two or more units may be integrated into one unit. The integrated units may be implemented in the form of hardware or software functional units. In addition, specific names of functional units and modules are merely for distinguishing between each other, and are not used for limiting the protection scope of embodiments of this application.

In addition, the apparatus for displaying a preview image in the above embodiment belongs to the same idea as the method for displaying a preview image. For specific operating processes and technical effects of the units and modules in the above embodiment, refer to the method embodiment. Details are not described herein again.

All or some of the above embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, the processes or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired manner (for example, by using a coaxial cable, an optical fiber, or a digital subscriber line (Digital Subscriber Line, DSL)) or a wireless manner (for example, by using infrared, radio, or microwaves). The computer-readable storage medium may be any usable medium accessible by a computer, or may be a data storage device such as a server or a data center in which one or more usable media are integrated. The usable media may be a magnetic medium (such as a floppy disk, a hard disk, or a magnetic tape), an optical medium (such as a digital versatile disc (Digital Versatile Disc, DVD)), a semiconductor medium (such as a solid state disk (Solid State Disk, SSD)), or the like.

The foregoing descriptions are merely optional embodiments of this application, and are not intended to limit this application. Any modification, equivalent replacement, or improvement made within the disclosed technical scope of this application shall fall within the protection scope of this application.

What is claimed is:

1. A method for displaying a preview image, applicable to an electronic device having a foldable display, wherein the foldable display comprises a first display and a second display, the first display is arranged on a front side of the electronic device, the second display is arranged on a back side of the electronic device, and the method comprises:

enabling a camera in response to detecting a camera enabling operation;

displaying a first preview image on the first display, wherein the first preview image is generated based on a first framing content collected by the camera;

lighting up the second display when a collaboration condition is triggered, wherein the collaboration condition is a condition of synchronously displaying the first preview image on the second display;

copying a first framing content through a camera service module, to obtain a second framing content, wherein the first framing content is obtained from the camera by a camera hardware management module; and adding the second framing content to a first graphics buffer through the camera service module, wherein the first graphics buffer is created by a camera application when it is determined that the collaboration condition is triggered, and the first graphics buffer is configured to store a framing content of a preview image to be displayed on the second display, generating a second preview image based on the second framing content; and displaying the second preview image on the second display.

2. The method of claim 1, wherein the electronic device comprises an image display system; and the lighting up the second display when a collaboration condition is triggered comprises:

creating a first function module through the image display system when the collaboration condition is triggered, wherein the first function module is configured to light up the second display; and lighting up the second display through the first function module.

3. The method of claim 2, wherein before the adding the second framing content to a first graphics buffer through the camera service module, the method further comprises:

creating the first graphics buffer through the camera application when the collaboration condition is triggered; and transmitting first address information of the first graphics buffer to the camera service module through the camera application; and the adding the second framing content to a first graphics buffer through the camera service module comprises:

adding the second framing content to the first graphics buffer based on the first address information through the camera service module.

4. The method of claim 2, wherein the image display system further comprises a graphics drawing module, and the generating a second preview image based on the second framing content comprises:

instructing the graphics drawing module to read the second framing content through the camera application when it is determined through the camera application that the first graphics buffer comprises the second framing content;

reading the second framing content from the first graphics buffer through the graphics drawing module; and generating the second preview image based on the second framing content through the graphics drawing module; and the displaying the second preview image on the second display comprises:

displaying the second preview image on the second display through the graphics drawing module.

5. The method of claim 2, wherein before the lighting up the second display when a collaboration condition is triggered, the method further comprises:

displaying a collaboration switch on the first display through the camera application when the foldable display is in an unfolded state and a rear camera is currently enabled, wherein the collaboration switch is configured to control whether to enable a function of synchronously displaying the first preview image on the second display; and determining that the collaboration condition is triggered when it is detected through the camera application that the collaboration switch is enabled.

6. The method of claim 5, wherein the unfolded state is that a folding angle of the foldable display is greater than a preset angle threshold and less than or equal to 180 degrees.

7. The method of claim 5, wherein the image display system further comprises a display status monitoring module, and a manner for determining that the foldable display is in the unfolded state comprises:

transmitting a registration request to the display status monitoring module through the camera application to request to monitor a state of the foldable display;

controlling the display status monitoring module to transmit first indication information to the camera application when it is monitored through the display status monitoring module that the foldable display is in the unfolded state, wherein the first indication information is configured to indicate that the display is in the unfolded state; and determining that the foldable display is in the unfolded state based on the first indication information through the camera application.

8. The method of claim 5, wherein after the determining that the collaboration condition is triggered when it is detected through the camera application that the collaboration switch is enabled, the method further comprises:

releasing the first graphics buffer through the camera application when it is detected through the camera application that the collaboration switch is disabled;

transmitting a collaboration termination message to the camera service module through the camera application, wherein the collaboration termination message is configured to instruct to stop storing the second framing content in the first graphics buffer; and controlling the camera service module to stop storing the second framing content in the first graphics buffer after the collaboration termination message is received.

9. The method of claim 8, further comprising:

controlling the first function module to turn off the second display through the image display system when it is detected through the camera application that the collaboration switch is disabled.

10. An apparatus for displaying a preview image, having a foldable display, wherein the foldable display comprises a first display and a second display, the first display is arranged on a front side of the apparatus, and the second display is arranged on a back side of the apparatus;

structure of the apparatus for displaying a preview image comprises a processor and a memory, the memory is configured to store a program that, when executed by one or more processors, cause the apparatus to be configured to:

enable a camera in response to detecting a camera enabling operation;

display a first preview image on the first display, wherein the first preview image is generated based on a first framing content collected by the camera;

light up the second display when a collaboration condition is triggered, wherein the collaboration condition is a condition of synchronously displaying the first preview image on the second display;

copy the first framing content to obtain a second framing content, copying the first framing content through a camera service module, to obtain a second framing content, wherein the first framing content is obtained from the camera by a camera hardware management module; and add the second framing content to a first graphics buffer through the camera service module, wherein the first graphics buffer is created by a camera application when it is determined that the collaboration condition is triggered, and the first graphics buffer is configured to store a framing content of a preview image to be displayed on the second display;

generate a second preview image based on the second framing content; and display the second preview image on the second display.

11. A non-transitory computer-readable storage medium, storing instructions that the instructions when run on a computer, cause the computer to be configured to:

enable a camera in response to detecting a camera enabling operation;

display a first preview image on the first display, wherein the first preview image is generated based on a first framing content collected by the camera;

light up the second display when a collaboration condition is triggered, wherein the collaboration condition is a condition of synchronously displaying the first preview image on the second display;

copying a first framing content through a camera service module, to obtain a second framing content, wherein the first framing content is obtained from the camera by a camera hardware management module; and add the second framing content to a first graphics buffer through the camera service module, wherein the first graphics buffer is created by a camera application when it is determined that the collaboration condition is triggered, and the first graphics buffer is configured to store a framing content of a preview image to be displayed on the second display, generate a second preview image based on the second framing content; and display the second preview image on the second display.

12. The apparatus of claim 10, wherein the apparatus comprises an image display system; and wherein lighting up the second display when a collaboration condition is triggered comprises:

creating a first function module through the image display system when the collaboration condition is triggered, wherein the first function module is configured to light up the second display.

13. The apparatus of claim 11, wherein before the adding the second framing content to a first graphics buffer through the camera service module further comprises:

creating the first graphics buffer through the camera application when the collaboration condition is triggered; and transmitting first address information of the first graphics buffer to the camera service module through the camera application; and the adding the second framing content to a first graphics buffer through the camera service module comprises:

adding the second framing content to the first graphics buffer based on the first address information through the camera service module.

14. The apparatus of claim 11, wherein the image display system further comprises a graphics drawing module, and the generating a second preview image based on the second framing content comprises:

instructing the graphics drawing module to read the second framing content through the camera application when it is determined through the camera application that the first graphics buffer comprises the second framing content;

reading the second framing content from the first graphics buffer through the graphics drawing module; and generating the second preview image based on the second framing content through the graphics drawing module; and the displaying the second preview image on the second display comprises:

displaying the second preview image on the second display through the graphics drawing module.

15. The non-transitory computer-readable storage medium of claim 11, wherein the apparatus comprises an image display system; and wherein lighting up the second display when a collaboration condition is triggered comprises:

creating a first function module through the image display system when the collaboration condition is triggered, wherein the first function module is configured to light up the second display; and lighting up the second display through the first function module.

16. The apparatus of claim 11, wherein before the lighting up the second display when a collaboration condition is triggered further comprises:

displaying a collaboration switch on the first display through the camera application when the foldable display is in an unfolded state and a rear camera is currently enabled, wherein the collaboration switch is configured to control whether to enable a function of synchronously displaying the first preview image on the second display; and determining that the collaboration condition is triggered when it is detected through the camera application that the collaboration switch is enabled.

17. The apparatus of claim 16, wherein the unfolded state is that a folding angle of the foldable display is greater than a preset angle threshold and less than or equal to 180 degrees.

18. The apparatus of claim 16, wherein the image display system further comprises a display status monitoring module, and a manner for determining that the foldable display is in the unfolded state comprises:

transmitting a registration request to the display status monitoring module through the camera application to request to monitor a state of the foldable display;

controlling the display status monitoring module to transmit first indication information to the camera application when it is monitored through the display status monitoring module that the foldable display is in the unfolded state, wherein the first indication information is configured to indicate that the display is in the unfolded state; and determining that the foldable display is in the unfolded state based on the first indication information through the camera application.

19. The apparatus of claim 16, wherein after the determining that the collaboration condition is triggered when it is detected through the camera application that the collaboration switch is enabled further comprises:

releasing the first graphics buffer through the camera application when it is detected through the camera application that the collaboration switch is disabled;

transmitting a collaboration termination message to the camera service module through the camera application, wherein the collaboration termination message is configured to instruct to stop storing the second framing content in the first graphics buffer; and controlling the camera service module to stop storing the second framing content in the first graphics buffer after the collaboration termination message is received.

20. The apparatus of claim 19, wherein after detecting through the camera application that the collaboration switch is disabled comprises:

controlling the first function module to turn off the second display through the image display system.

\* \* \* \* \*